US008359535B2

(12) United States Patent
Watanabe et al.

(10) Patent No.: US 8,359,535 B2
(45) Date of Patent: Jan. 22, 2013

(54) ORDER TAKING APPARATUS

(75) Inventors: Naoki Watanabe, Tokyo (JP); Mika Hirama, Tokyo (JP); Masaki Narahashi, Tokyo (JP); Sou Miyazaki, Tokyo (JP); Shuichi Tsujimoto, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 419 days.

(21) Appl. No.: 12/788,089

(22) Filed: May 26, 2010

(65) Prior Publication Data

US 2011/0029866 A1 Feb. 3, 2011

(30) Foreign Application Priority Data

Jul. 31, 2009 (JP) ................................. 2009-179652

(51) Int. Cl.
*G06F 3/01* (2006.01)

(52) U.S. Cl. ....................................... 715/702; 715/810

(58) Field of Classification Search .................. 715/702, 715/810

See application file for complete search history.

(56) References Cited

U.S. PATENT DOCUMENTS 7,336,379 B2 * 2/2008 Hara ............................ 358/1.15
7,603,287 B2 * 10/2009 Kargman ........................ 705/15
8,190,483 B2 * 5/2012 Woycik et al. ............... 705/26.1
2002/0126149 A1 * 9/2002 Umeda ......................... 345/769
2002/0156682 A1 * 10/2002 DiPietro ......................... 705/16
2006/0218040 A1 9/2006 Sabapathypillai
2010/0097445 A1 * 4/2010 Hirama et al. .................. 348/51
2010/0097446 A1 4/2010 Miyazaki et al.
2010/0100844 A1 4/2010 Narahashi et al.
2012/0179584 A1 * 7/2012 Woycik et al. ............... 705/27.1

FOREIGN PATENT DOCUMENTS

GB 2444852 6/2008
WO WO-2005/114363 12/2005

OTHER PUBLICATIONS

EPO Search Report dated Nov. 9, 2010, European Patent Application No. 10163436.8.
Japanese Office Action dated May 24, 2011, Japanese Patent Application No. 2009-179652.

* cited by examiner

*Primary Examiner* — Sara England
(74) *Attorney, Agent, or Firm* — Patterson & Sheridan, LLP

(57) ABSTRACT

According to one embodiment an order taking apparatus includes a storage processing section, a display processing section, an enlargement processing section. The storage processing section configured to read information on the order for the menu item the input of which has been accepted by the order taking section, and to store the information in a predetermined order information storage region. The display processing section configured to read an image of the menu item the input of which has been accepted by the order taking section, and to allow a display device to display the image. The enlargement processing section configured such that when the menu item image is enlarged, the enlargement processing section rewrites the information on the order for the menu item which is of the same type as that of the current menu item but has a serving size larger than that of the current menu item.

19 Claims, 24 Drawing Sheets

32

| Menu item ID | Category | Menu item name | Serving size | Serving size ratio | Price |
|---|---|---|---|---|---|
| 1011 | Drinks | Iced tea | S | 1 | 150 |
| 1012 | | | M | 1.2 | 180 |
| 1013 | | | L | 1.6 | 230 |
| 1021 | | Hot coffee | S | 1 | 150 |
| 1022 | | | M | 1.2 | 180 |
| 1023 | | | L | 1.6 | 230 |
| 1031 | | Orange juice | S | 1 | 100 |
| 1032 | | | M | 1.6 | 150 |
| 1033 | | | L | 2.3 | 200 |
| 1041 | | Coke | S | 1 | 100 |
| 1042 | | | M | 1.6 | 150 |
| 1043 | | | L | 2.3 | 200 |
| 2011 | Hamburger | Hamburger | | | 180 |
| : | : | : | : | : | : |

FIG. 2

| Menu item ID | Menu item image |
|---|---|
| 1031 |  |
| 1032 |  |
| 1033 |  |
| 1041 |  |
| 1042 |  |
| 1043 |  |
| 2011 |  |
| : | : |

| Table No. | Menu item ID | Menu item name | Serving size | Price | Order quantity |
|---|---|---|---|---|---|
| 3 | | | | | |

FIG. 9

| Table No. | Menu item ID | Menu item name | Serving size | Price | Order quantity |
|---|---|---|---|---|---|
| 3 | 2011 | Hamburger | | 180 | 1 |
| | 1032 | Orange juice | M | 150 | 1 |
| | : | : | : | : | : |

FIG. 10

32

| Menu item ID | Category | Menu item name | Ingredient ID | Ingredient name | Serving size | Serving size ratio | Price |
|---|---|---|---|---|---|---|---|
| 2012 | Hamburger | Special burger | 201211 | Patty | 80g | 1 | 120 |
| | | | 201212 | | 120g | 1.5 | 160 |
| | | | 201213 | | 160g | 2 | 200 |
| | | | 201221 | Tomato | One slice | 1 | 40 |
| | | | 201222 | | Two slices | 2 | 80 |
| | | | 201231 | Salad | 30g | 1 | 60 |
| | | | 201232 | | 50g | 1.6 | 90 |
| | | | 201241 | Cheese | 20g | 1 | 20 |
| | | | 201242 | | 30g | 1.5 | 30 |
| | | | 201243 | | 40g | 2 | 40 |
| | | | 201251 | Bun | S | 1 | 100 |
| | | | 201252 | | M | 1.6 | 150 |
| | | | 201253 | | L | 2.3 | 200 |
| 2013 | | Avocado burger | 201311 | Patty | 80g | 1 | 180 |
| | | | : | : | : | : | : |

FIG. 18

33
| Ingredient ID | Ingredient name |
|---|---|
| 201211 | 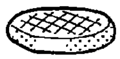 |
| 201212 | 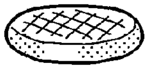 |
| 201213 | 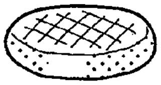 |
| 201221 |  |
| 201222 |  |
| 201231 |  |
| 201232 |  |
| : | : |
F I G. 19
| Table No. | Menu item ID | Menu item name | Ingredient ID | Ingredient name | Ingredient serving size | Total price | Order quantity |
|---|---|---|---|---|---|---|---|
| | | Special burger | 201212 | Patty | 120g | 430 | 1 |
| | | | 201221 | Tomato | One slice | | |
| | | | 201231 | Salad | 30g | | |
| | | | 201241 | Cheese | 20g | | |
| | | | 201252 | Bun | M | | |
| | : | : | : | : | : | : | : |
F I G. 20

ORDER TAKING APPARATUS

CROSS-REFERENCE TO RELATED APPLICATIONS

This application is based upon and claims the benefit of priority from Japanese Patent Application No. 2009-179652, filed Jul. 31, 2009; the entire contents of which are incorporated herein by reference.

FIELD

Embodiments described herein relate generally to a apparatus configured to take orders for menu items provided in a restaurant.

BACKGROUND

Self-order systems for restaurants are already known. By way of example, in one self-order system, an order taking terminal is installed on each table in a restaurant, the terminals being connected to an order management computer via a network.

An order taking terminal comprises a display with a touch panel on which a menu of all items provided by the restaurant is displayed. A customer touches desired items in the menu. The terminal accepts the touched menu items and notifies the computer of the menu items.

For some types of menu item in the restaurant, menu items are treated as different when the items are of the same type but are different in serving size; for some drinks, different prices are set for the respective container size, that is, a small container, a medium-sized container, and a large container. If a restaurant dealing with such menu items adopts the above-described self-order system, the restaurant adds, for example, the items "small orange juice", "medium orange juice", and "large orange juice" to the list shown on the display so that customers can select any of the items.

However, simple addition of designations indicating the serving sizes may fail to let customers properly appreciate the differences between the volumes of the menu items. Thus, customers may order menu items with unexpected volumes. There has been a demand for an order taking system capable of taking orders from customers while letting customers intuitively appreciate the differences between the serving sizes of the menu items.

BRIEF DESCRIPTION OF THE DRAWINGS

FIG. 2 is a diagram showing an example of data stored in a menu item information file according to the first embodiment;

FIG. 9 is a diagram showing an order information record stored in an order information storage region according to a first embodiment;

FIG. 10 is a diagram showing order item information written in the record shown in FIG. 9;

FIG. 18 is a diagram showing an example of data stored in a menu item information file according to a second embodiment;

FIG. 19 is a diagram showing an example of data stored in a menu item image file according to the second embodiment;

FIG. 20 is a diagram showing order information written in an order information record stored in an order information storage region according to the second embodiment;

DETAILED DESCRIPTION

In general according to one embodiment, an order taking apparatus includes an order taking section, a storage processing section, a display processing section, an enlargement processing section. The order taking section configured to accept input of an ordered one of a group of menu items. The storage processing section configured to read information on the order for the menu item the input of which has been accepted by the order taking section, from a menu item information file in which information on the order for each menu item is stored and to store the information in a predetermined order information storage region. The display processing section configured to read an image of the menu item the input of which has been accepted by the order taking section, from a menu item image file in which an image of each menu item is stored and to allow a display device to display the image. The enlargement processing section configured such that when the menu item image displayed on the display device is enlarged, the enlargement processing section rewrites the information on the order for the menu item stored in the order information storage region to information on an order for a menu item which is of the same type as that of the current menu item but has a serving size larger than that of the current menu item.

The following embodiments relate to an order taking terminal 1 installed on a table in association with a self-order system in a restaurant. In taking orders, the order taking terminal 1 considers menu items which are of the same type but different in serving size to be different from one another.

First Embodiment

Figure 1:
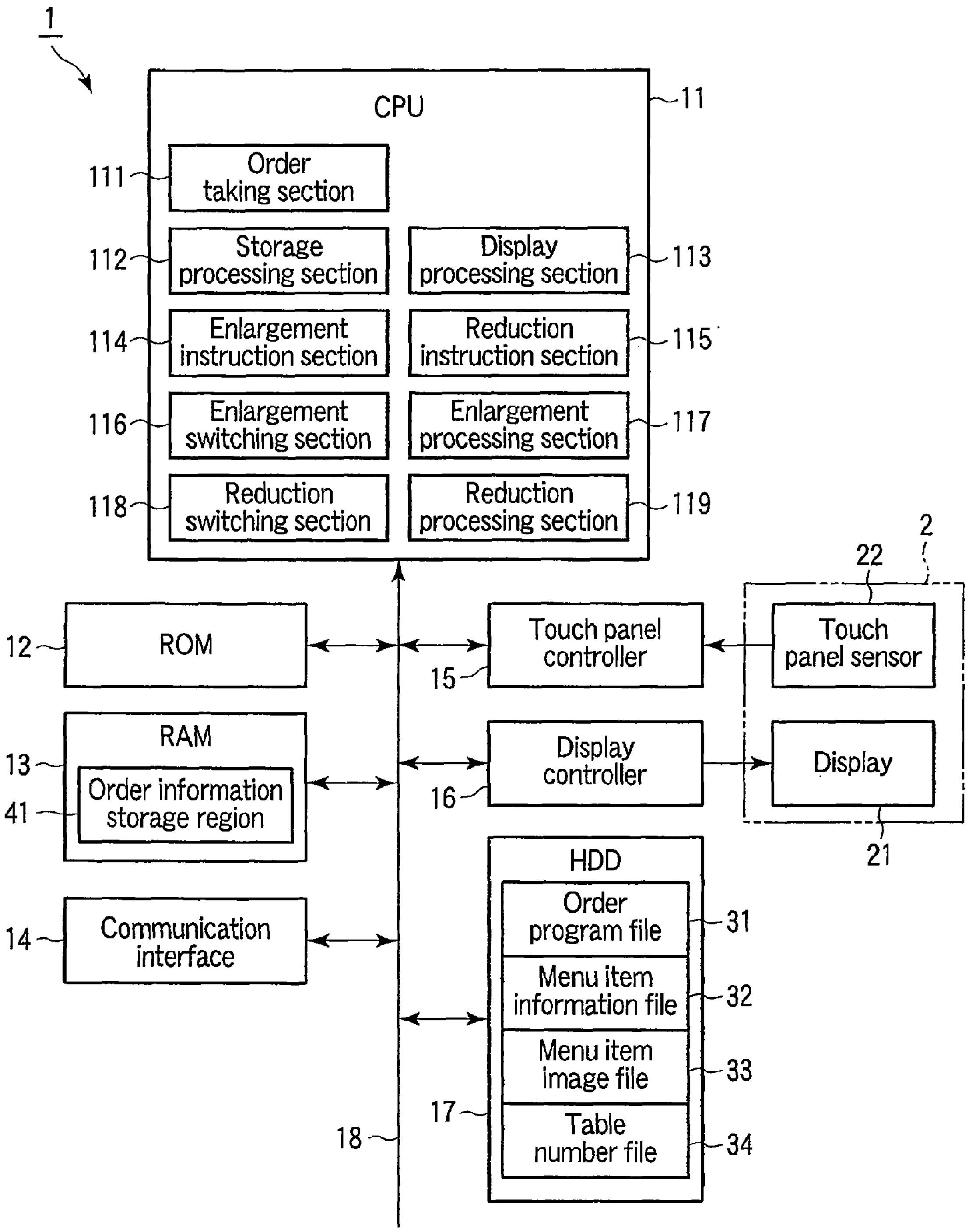
FIG. 1 is a block diagram of an order taking terminal according to a first embodiment and a second embodiment.

FIG. 1 is a block diagram showing the configuration of the order taking terminal 1. The terminal 1 comprises a display device 2 with a touch panel. The device 2 comprises a display 21 serving as a display device and a touch panel sensor 22 serving as an input device. The touch panel sensor 22 is overlaid on a screen of the display 21.

The order taking terminal 1 comprises a central processing unit (CPU) 11, a read-only memory (ROM) 12, a random access memory (RAM) 13, a communication interface 14, a touch panel controller 15, a display controller 16, and a hard disk drive (HDD) 17. The CPU 11 is connected to the ROM 12, the RAM 13, communication interface 14, touch panel controller 15, display controller 16, and HDD 17 via a bus 18 such as an address or data bus.

The communication interface 14 controls transmission and reception of data between the order taking terminal 1 and an order management server (not shown in the drawings) via a wired or wireless communication link.

The order management server has functions I to IV:

(I) a function to support an order taking process for menu items which process is executed by each order taking terminal 1;

(II) a function to register data on orders taken by each order taking terminal 1;

(III) a function to instruct the kitchen to prepare ordered items based on the registered order data; and (IV) a function to support a checkout operation at the checkout counter based on the registered order data.

The display controller 16 controls the display of screens on the display 21. Based on a signal from the touch panel sensor 22, the touch panel controller 15 senses the two-dimensional coordinates of a touched site on the screen. The touch panel sensor 22 functions as a contact input section configured to sense the presence or absence of touch with at least two points on the screen and motion of the touch points to determine that information has been input.

The HDD 17 is configured to store a program file 31, a menu item information file 32, a menu item image file 33, and a table number file 34. The program file 31 is configured to store at least an order taking program described below.

The menu item information file 32 is configured to store information on orders for each menu item provided in the restaurant.

FIG. 2 shows an example of data stored in the menu item information file 32. A menu item "hamburger" belonging to a category "hamburgers" does not involve any item which is of the same type as that of this menu item but has a serving size different from that of this menu item. Menu items "iced tea", "hot coffee", "orange juice", and "Coke" belonging to a category "drinks" each involve items which are of the same type as that of this menu item but have serving sizes different from that of this menu item, that is, a small serving, a medium serving, and a large serving.

An administrator of the system (for example, a restaurant manager) sets a specific menu item ID and a specific price for each menu item. Furthermore, for each menu item involving items which are of the same type as that of this menu item but have serving sizes different from that of this menu item, the administrator sets serving size information and a serving size ratio. The serving size ratio indicates the levels of serving size of the medium menu item and the large menu item based on the serving size of the small menu item, which is set to 1.

As shown in FIG. 2, the menu item information file 32 stores, as information on an order, the category, name, serving size, serving size ratio, and price of each menu item specified by the corresponding menu item ID identifying the menu item.

The administrator may determine the serving size ratio by setting the serving size of the medium or large menu item to 1, which corresponds to the reference.

The menu item image file 33 stores image data on each menu item. Image data preferably contains color images.

Figure 3:
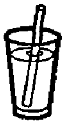
FIG. 3 is a diagram showing an example of data stored in a menu item image file according to the first embodiment.
Figure 3:
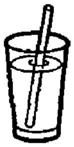
Figure 3:
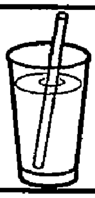
Figure 3:
Figure 3:
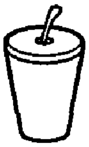
Figure 3:
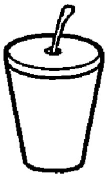
Figure 3:
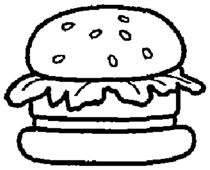

FIG. 3 shows an example of data stored in the menu item image file 33. The data in FIG. 3 corresponds to some of the menu items illustrated in the menu item information file 32 in FIG. 2. That is, the menu item image file 33 stores, for each menu item ID, image data on the menu item specified by the menu item ID.

The order taking terminal 1 may comprise the stereoscopic display 21 and use three-dimensional image data to three-dimensionally display images of menu items.

The table number file 34 stores the identification number (table number) of the table on which the order taking terminal 1 is installed. Different table numbers are set for the tables.

In the order taking terminal 1 configured as described above, an order information storage region 41 in which order information records described below are temporarily stored is formed in the RAM 13. When the order taking program stored in the program file 31 is started, the CPU 11 implements the functions of an order taking section 111, a storage processing section 112, a display processing section 113, an enlargement instruction section 114, a reduction instruction section 115, an enlargement switching section 116, an enlargement processing section 117, a reduction switching section 118, and a reduction processing section 119. These functions will be specifically described below with reference to flowcharts in FIGS. 4 to 8.

Figure 4:
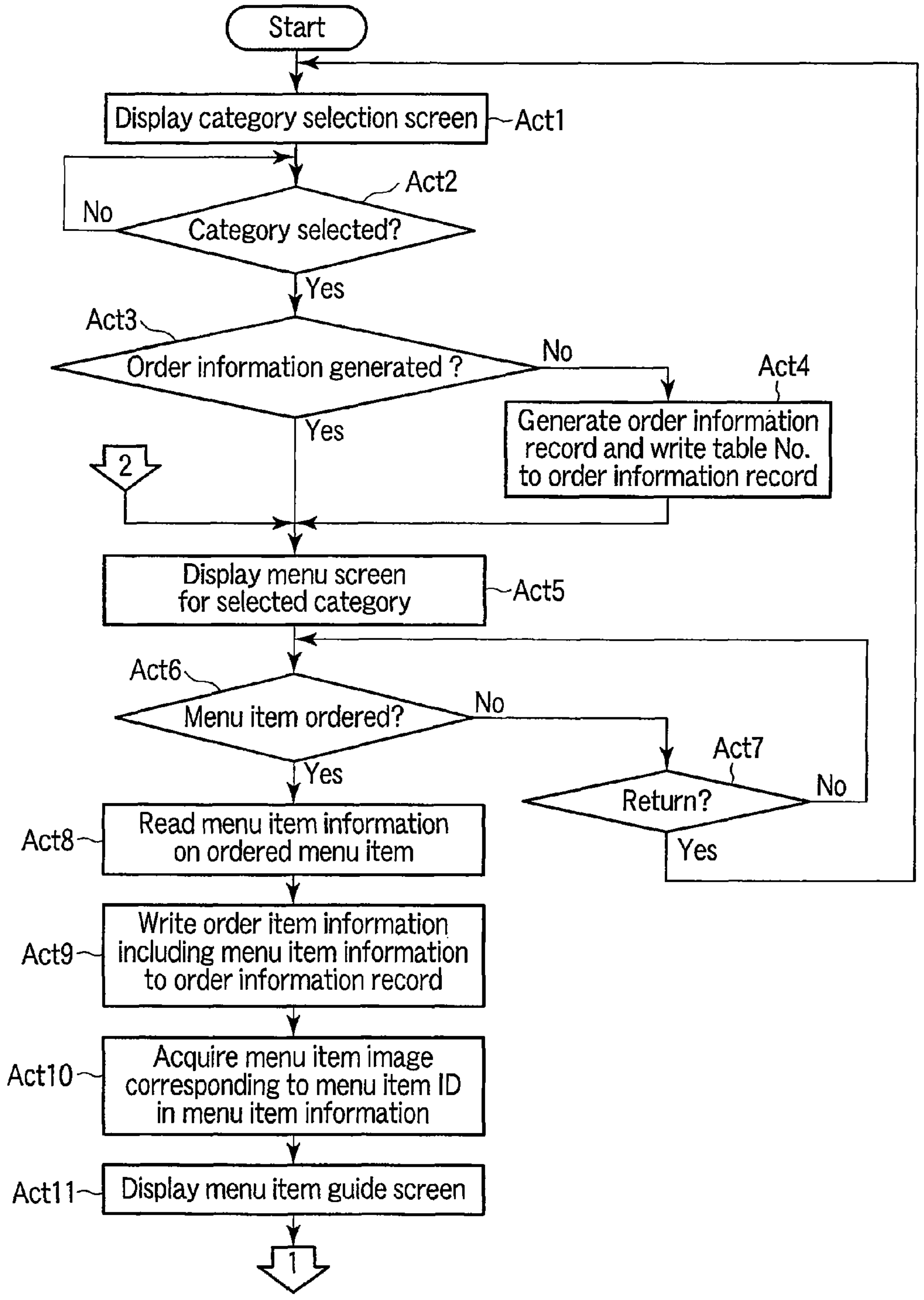
FIG. 4 is a flowchart showing the former half of a main process procedure executed by a CPU when an order management program is started according to the first embodiment.

When the order taking program is started, the CPU 11 allows the display 21 to show a category selection screen 50 (Act 1 of FIG. 4). Then, the CPU 11 waits for the category of a menu item to be selected (Act 2 of FIG. 4).

Figure 11:
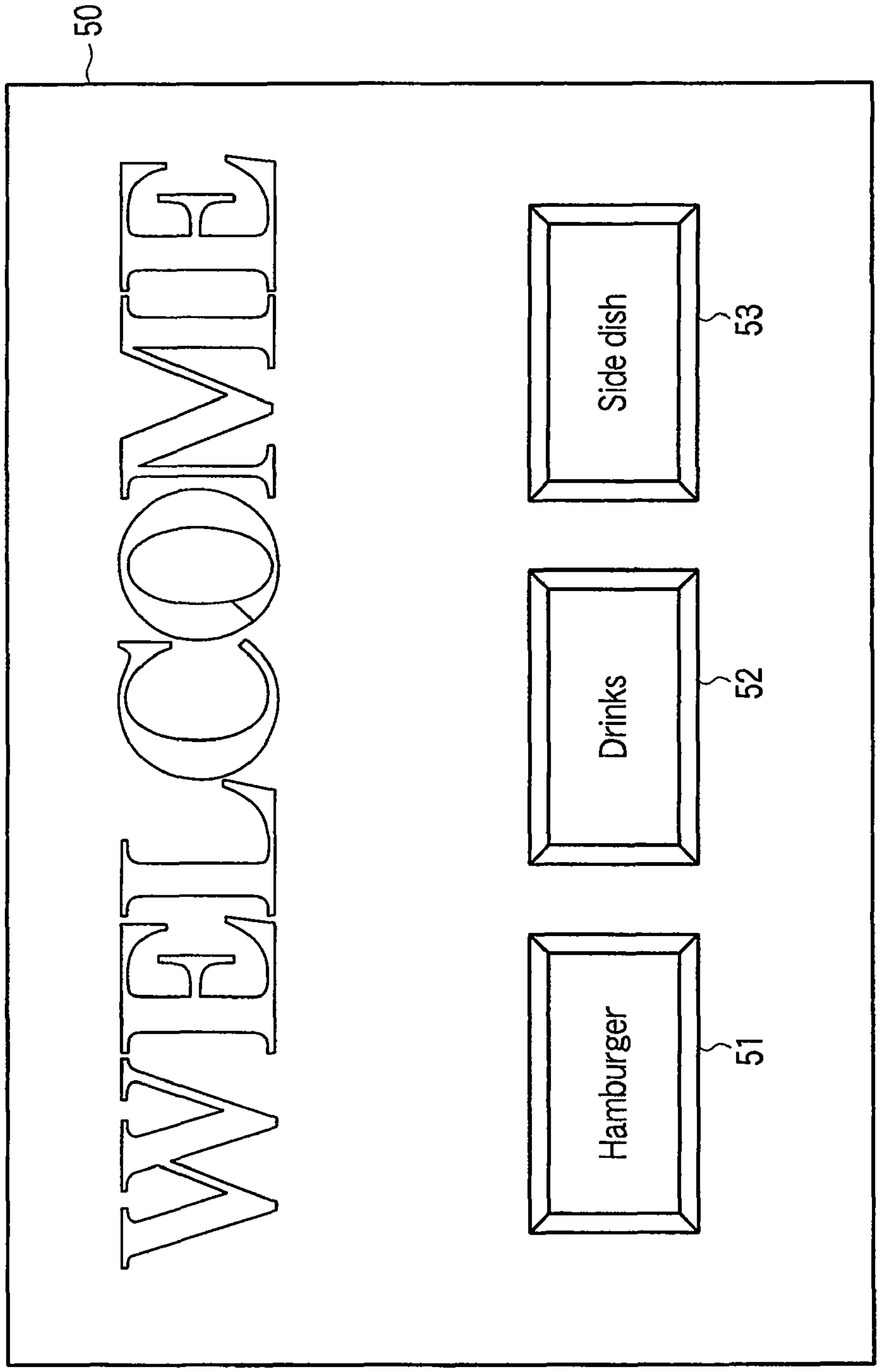
FIG. 11 is a diagram showing an example of a category selection screen shown on a display according to the first embodiment.

FIG. 11 shows an example of the category selection screen 50. As shown in FIG. 11, the CPU 11 allows a plurality of selection buttons 51, 52, and 53 to be displayed on the category selection screen 50; categories into which the menu items are classified are assigned to the respective selection buttons 51, 52, and 53.

When one of the selection buttons 51, 52, and 53 is touched, the CPU 11 determines that the category assigned to the touched button 51, 52, or 53 has been selected. When the category is selected (YES in Act 2), the CPU 11 determines whether or not an order information record has been generated (Act 3 of FIG. 4).

When the order information storage region 41 is blank, no order information record has been generated. In this case (NO in Act 3), the CPU 11 generates and stores an order information record in the order information storage region 41. The CPU 11 then writes the table number stored in the table number file 34, in the record (Act 4 of FIG. 4).

FIG. 9 shows an example of the order information record. As shown in FIG. 9, the order information record contains the table number and the ID, name, serving size, price, and order quantity of the menu item. For the ID, name, serving size, price, and order quantity of the menu item, data on a plurality of menu items can be written in the record. At the point in time of the process in Act 4, only the table number, for example, 3, has been written.

When an order information record is generated in the order information storage region 41 (Act 4) or stored in the order information storage region 41 (YES in Act 3), the CPU 11 allows the display 21 to show a menu screen 60 (Act 5 of FIG. 4). The menu screen 60 shows a list of menu items belonging to the selected category.

Figure 12:
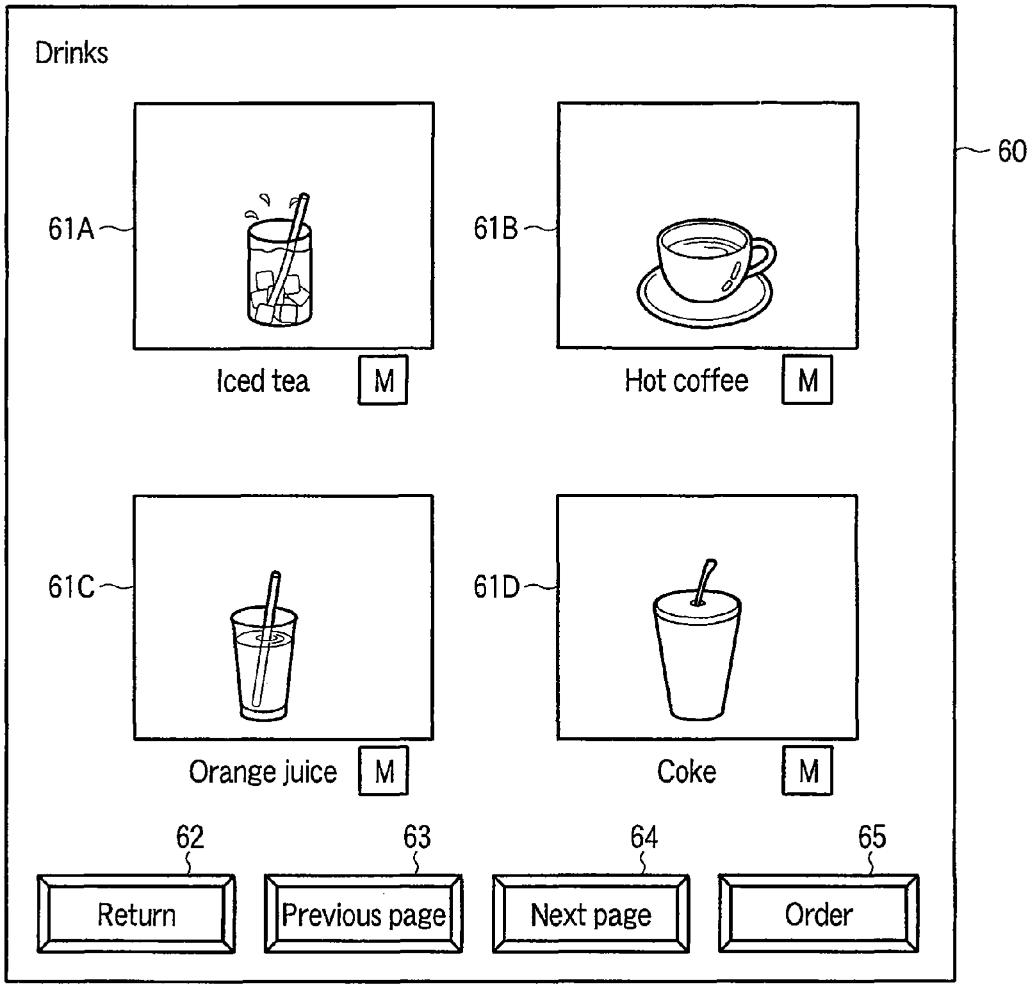
FIG. 12 is a diagram showing an example of a menu screen shown on the display according to the first embodiment.

FIG. 12 shows an example of the menu screen 60. When the selection button 52 for the category "drinks" is touched on the category selection screen 50, the CPU 11 allows the menu screen 60 to be displayed. As shown in FIG. 12, the CPU 11 allows a plurality of menu buttons 61 (61A to 61D) and function buttons to be displayed on the menu screen 60. The function buttons include a return button 62, a previous page button 63, a next page button 64, and an order button 65.

The CPU 11 assigns menu items (iced tea, hot coffee, orange juice, Coke, and the like) belonging to the category "drinks", to the respective menu buttons 61. Then, the CPU 11 allows images to be displayed on the respective menu buttons 61; the images are contained in the image data stored in the menu item image file 33 in association with the menu item IDs of the menu items assigned to the respective buttons. Furthermore, the CPU 11 allows the names of the menu items stored in the menu item information file 32 in association with the menu item IDs to be displayed in connection with the respective menu buttons 61.

For menu items such as drinks which are considered to be different from one another when the menu items are of the same type but are different in serving size, the administrator sets the medium item to be the default. The CPU allows images of the medium menu items to be displayed on the respective menu buttons 61.

The administrator may set small or large to be the default serving size. Alternatively, the administrator may set the most frequently ordered serving size to be the default for each menu item.

The display 21 is limited in terms of the number of menu buttons 61 that can be displayed on the screen. Thus, if the number of menu items belonging to the same category exceeds this limit, the CPU 11 divides the menu screen 60 into a plurality of pages. Then, to allow pages to be sequentially switched by activating the previous page button 63 or the next page button 64, the CPU 11 controls display of the menu screen 60.

After the menu screen 60 is displayed, the CPU accepts the order for the menu item (Act 6 of FIG. 4) or waits for the return button 62 to be touched (Act 7 of FIG. 4).

When the return button 62 is touched (YES in Act 7), the CPU 11 returns the display 21 to the category selection screen 50 (Act 1).

When the menu button 61 and the order button 65 are touched, the CPU 11 determines that the menu item assigned to the menu button 61 has been ordered. Here, the CPU 11 executes the processes in Acts 1, 2, 5, and 6 to implement the functions of the order taking section 111.

The order taking section 111 is not limited to the above-described configuration. For example, the following configuration is possible. When a scanner connected to the order taking terminal 1 is used to scan a code (a barcode, a two-dimensional data code, or the like) printed on the menu, an order for the menu item corresponding to the code is accepted. Furthermore, the processes in Acts 1 and 2 may be omitted for restaurants that avoid classifying menu items into categories.

Upon accepting the order for the menu item (YES in Act 6), the CPU 11 generates a pointer pointing to information on the menu item. The CPU 11 then reads the menu item information pointed to by the pointer, from the menu item information file 32 (Act 8 of FIG. 4). The CPU 11 writes the ID, name, serving size, and price of the menu item in the menu item information as well as a quantity of one in the order information record as new order item information (Act 9 of FIG. 4).

Here, the CPU 11 executes the processes in Acts 8 and 9 to implement the functions of the storage processing section 112.

The CPU 11 searches the menu item image file 33 using the menu item ID in the menu item information. The CPU 11 then reads the image data stored in association with the menu item ID (Act 10 of FIG. 4). The CPU 11 creates a menu item guide screen 70 based on the image in the image data and the menu item information, and allows the display 21 to show the menu item guide screen 70 (Act 11 of FIG. 4).

Figure 13:
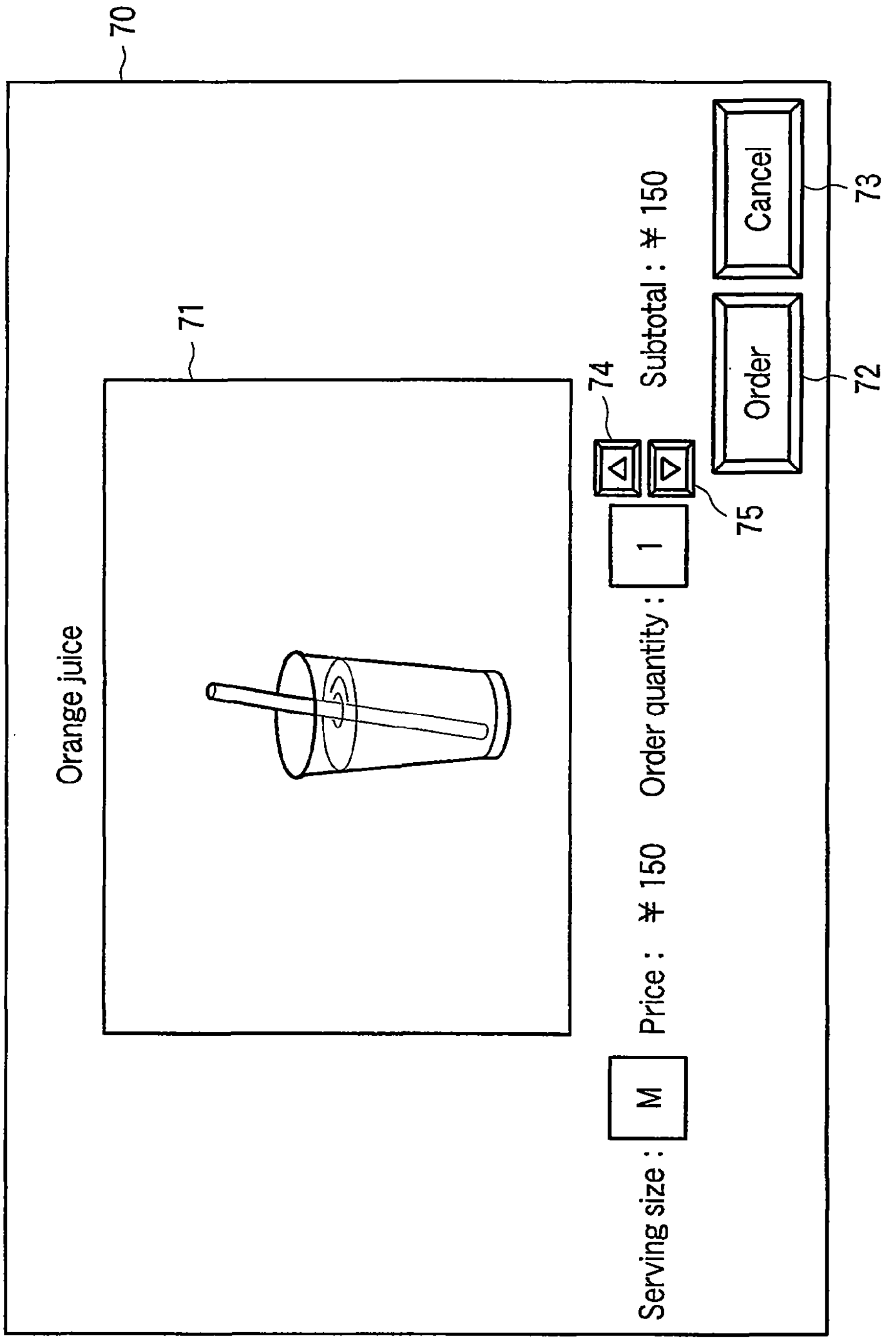
FIG. 13 is a diagram showing an example of a menu item guide screen shown on the display according to the first embodiment.

FIG. 13 shows an example of the menu item guide screen 70. When the menu button 61C for the menu item "medium orange juice" is touched on the menu screen 60, the CPU 11 allows the menu item guide screen 70 in FIG. 13 to be displayed.

As shown in FIG. 13, the CPU 11 forms a menu item image display region 71 in the menu item guide screen 70. The CPU 11 then allows an image corresponding to the medium orange juice to be displayed in the region 71. The CPU 11 also allows the serving size "medium", the price of 150 yen, the order quantity of one, and the subtotal of 150 yen to be displayed. The subtotal is calculated by multiplying the price by the order quantity for each piece of order item information stored in the order information storage region 41.

The CPU 11 allows an order button 72, a cancel button 73, an up button 74, and a down button 75 to be displayed on the menu item guide screen 70. The up button 74 instructs an increase in order quantity. The down button 75 instructs a decrease in order quantity.

Here, the CPU 11 executes the processes in Acts 10 and 11 to implement the functions of the display processing section 113.

Figure 5:
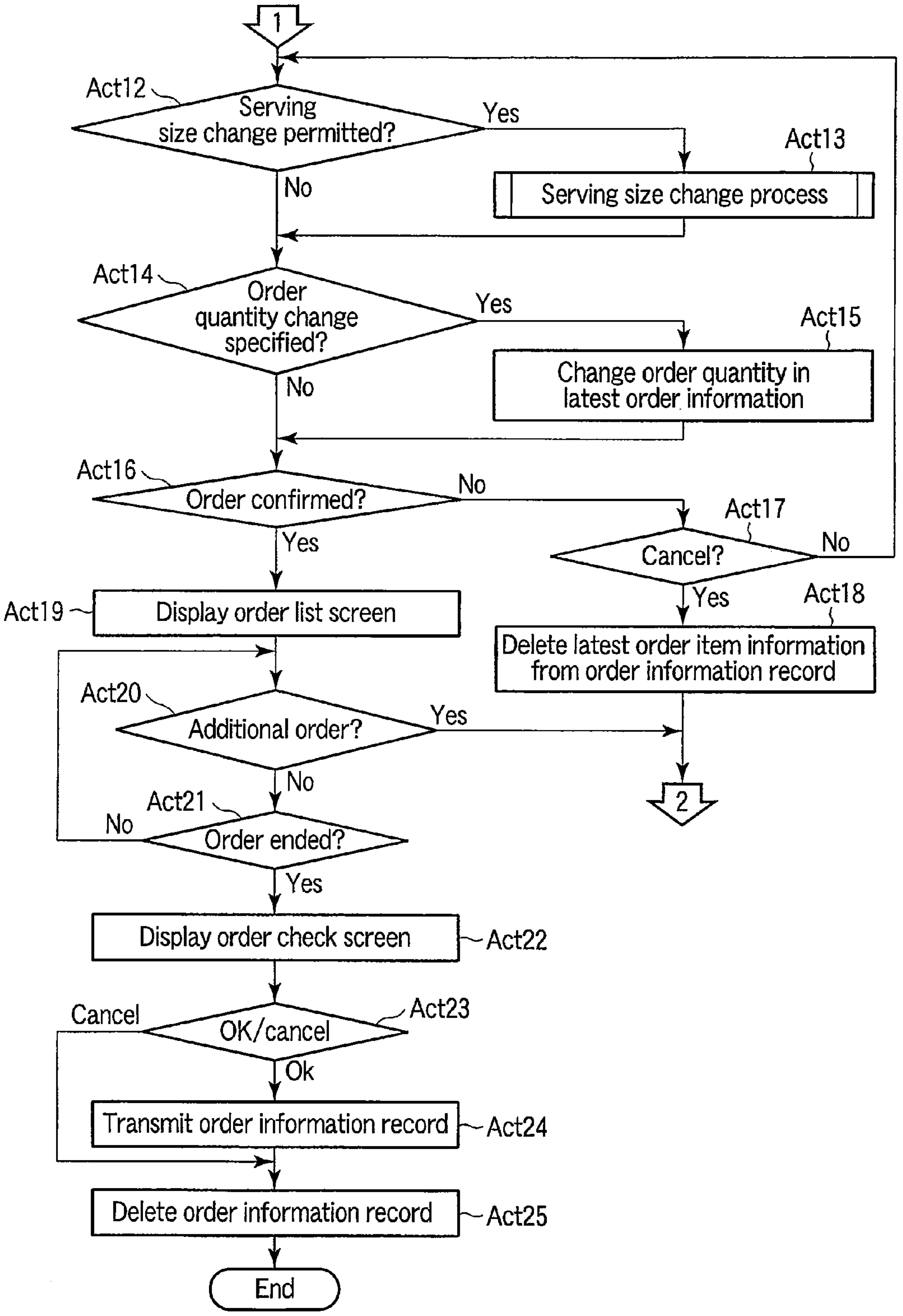
FIG. 5 is a flowchart showing the latter half of the main process procedure executed by the CPU when the order management program is started according to the first embodiment.

After the menu item guide screen 70 is displayed, the CPU 11 determines whether or not a serving size change is permitted for the menu item (Act 12 of FIG. 5). If the order item information written in the order information record as a result of the process in Act 9 includes serving size information, a serving size change is permitted for the menu item. If the order item information written in the order information record as a result of the process in Act 9 includes no serving size information, a serving size change is not permitted for the menu item.

If a serving size change is permitted for the menu item (YES in Act 12), the CPU 11 executes a serving size change process (Act 13 of FIG. 5). This process will be described below in detail.

If the serving size change process is finished (Act 13) or a serving size change is not permitted for the menu item (NO in Act 12), the CPU 11 determines whether or not an order quantity change has been specified (Act 14 of FIG. 5). If the up button 74 is touched (YES in Act 14), the CPU 11 increases the order quantity in the order item information by a value corresponding to the number of touch operations (Act 15 of FIG. 4). If the down button 75 is touched (YES in Act 14), the CPU 11 decreases the order quantity by a value corresponding to the number of touch operations (Act 15 of FIG. 4). The minimum value of the order quantity is 1.

If the order quantity change process is finished (Act 16) or an order quantity change is not specified (NO in Act 14), the CPU 11 waits for a change conformation to be specified (Act 16 of FIG. 5) or waits for an order cancellation to be specified (Act 17 of FIG. 5).

When the cancel button 73 is touched (YES in Act 17), the CPU 11 deletes the latest order item information from the order information record (Act 18 of FIG. 5). Thereafter, the CPU 11 returns the display 21 to the menu screen 60 (Act 5).

When the order button 72 is touched (YES in Act 16), the CPU 11 creates an order list screen 80 based on the data in the order information record and allows the display 21 to show the order list screen 80.

Figure 14:
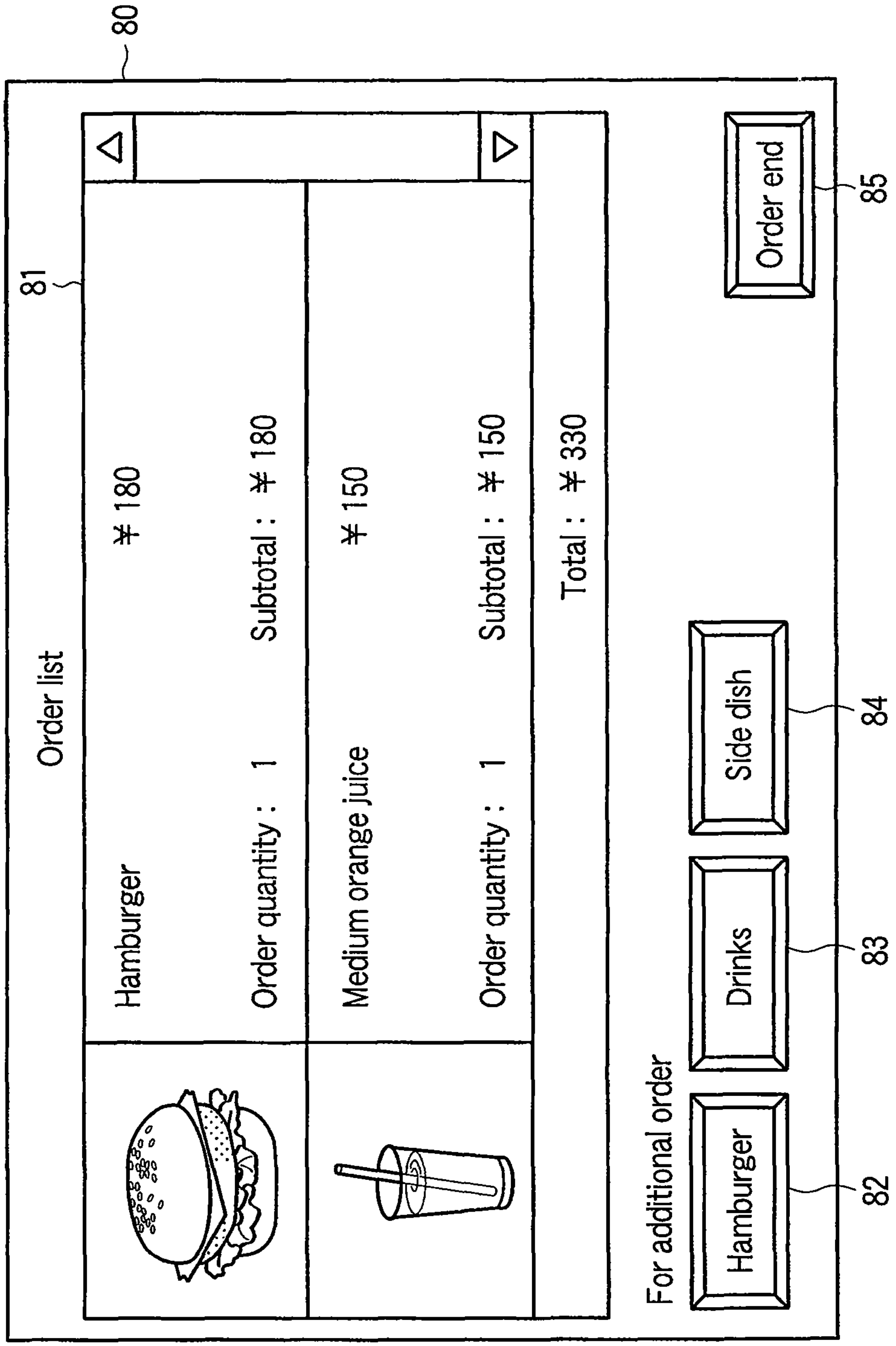
FIG. 14 is a diagram showing an example of an order list screen shown on the display according to the first embodiment.

FIG. 14 shows an example of the order list screen 80. When the order information record shown in FIG. 10 is stored in the order information storage region 41, the CPU 11 allows the order list screen 80 in FIG. 14 to be displayed. As shown in FIG. 14, the CPU 11 allows an order list 81 based on the data in the order information record, a plurality of category buttons 82, 83, and 84, and an order end button 85 to be displayed on the order list screen 80.

When the order list screen 80 is displayed, the CPU 11 waits for an additional order to be specified (Act 20 of FIG. 5) or for an order end to be specified (Act 21 of FIG. 5). When one of the category buttons 82, 83, and 84 is touched, the CPU 11 accepts an additional order. In this case (YES in Act 20), the CPU 11 allows the display 21 to show the menu screen 60 for the selected category (Act 5).

When the order end button 85 is touched, the CPU 11 terminates the order taking process. In this case (YES in Act 21), the CPU 21 allows the display 21 to show an order check screen 90 (Act 22 of FIG. 5).

Figure 15:
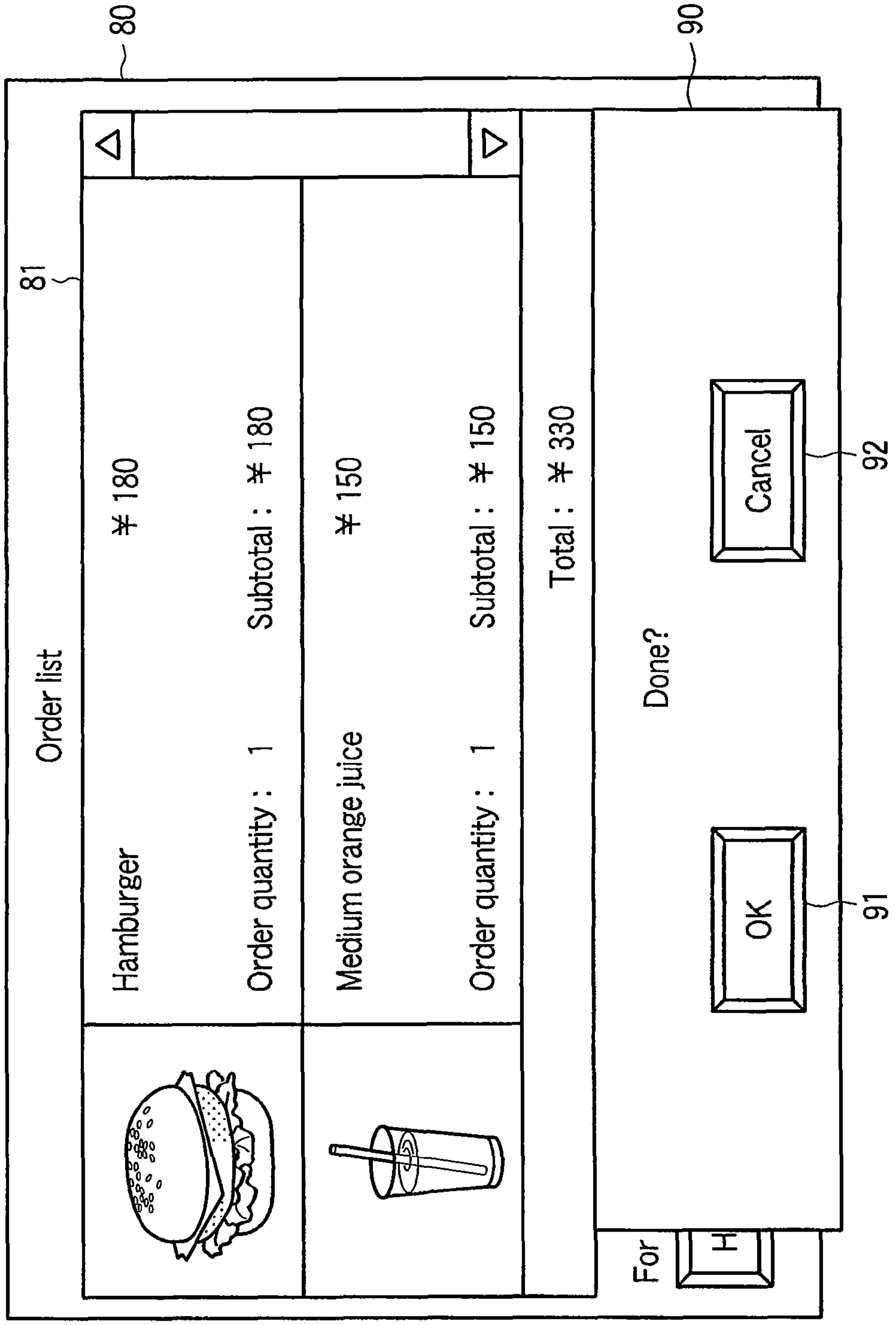
FIG. 15 is a diagram showing an example of an order check screen shown on the display according to the first embodiment.

FIG. 15 shows an example of the order check screen 90. As shown in FIG. 15, the CPU 11 allows the order check screen 90 comprising an OK button 91 and a cancel button 92 to be displayed superimposedly over the order list screen 80.

When the order check screen 90 is displayed, the CPU 11 waist for the OK button 91 or the cancel button 92 to be activated (Act 23 of FIG. 5).

When the OK button 91 is touched ("OK" in Act 23), the CPU 11 transmits the order information record stored in the order information storage region 41, to the order management server via the communication interface 14 (Act 24 of FIG. 5). When the order information record is transmitted, the CPU 11 clears the order information storage region 41 (Act 25 of FIG. 5).

If the cancel button 92 is touched ("Cancel" in Act 23), the CPU 11 clears the order information storage region 41 without transmitting the order information record (Act 25 of FIG. 5). The process is then finished.

Figure 6:
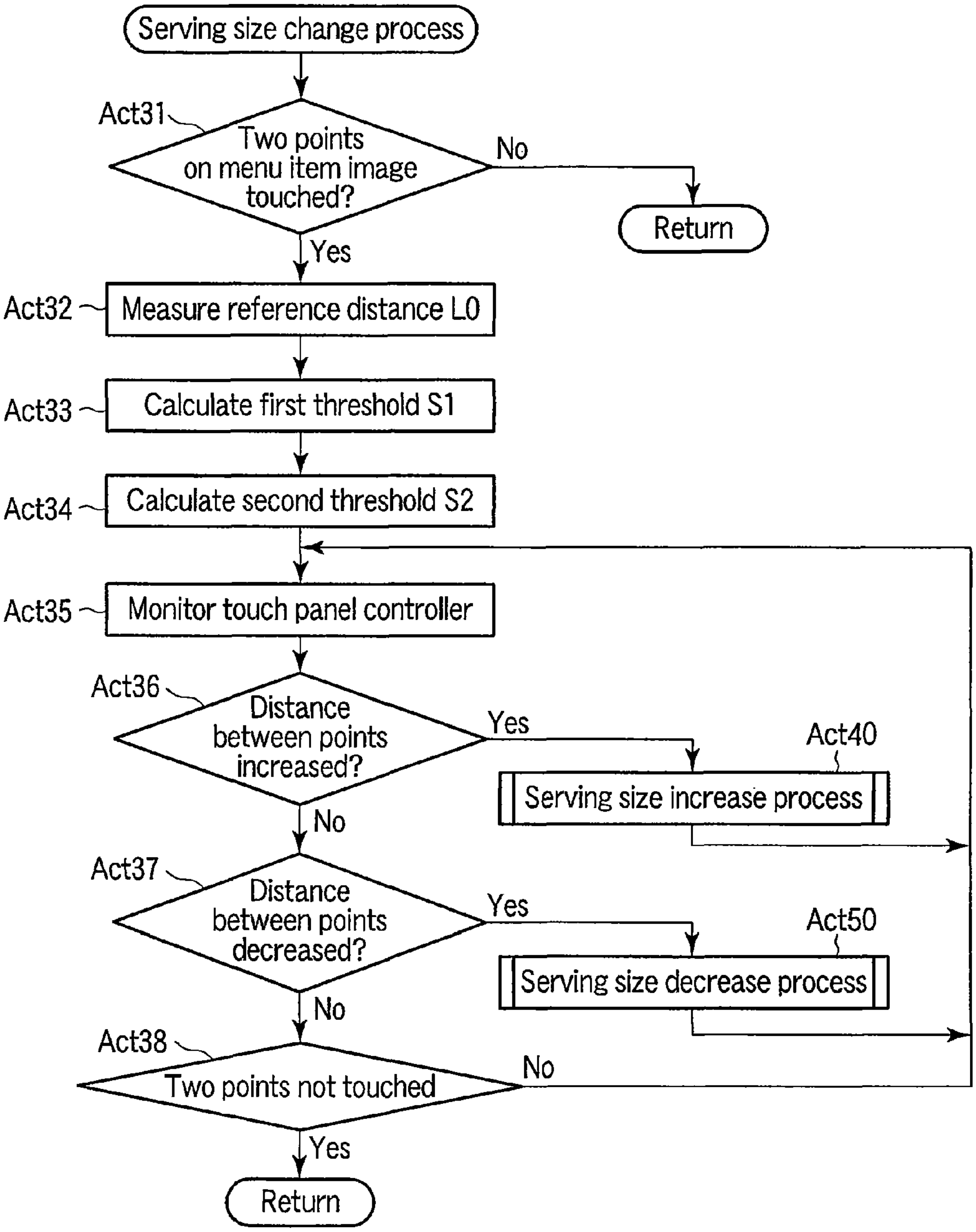
FIG. 6 is a flowchart specifically showing the procedure of a serving size change process in FIG. 5.
Figure 7:
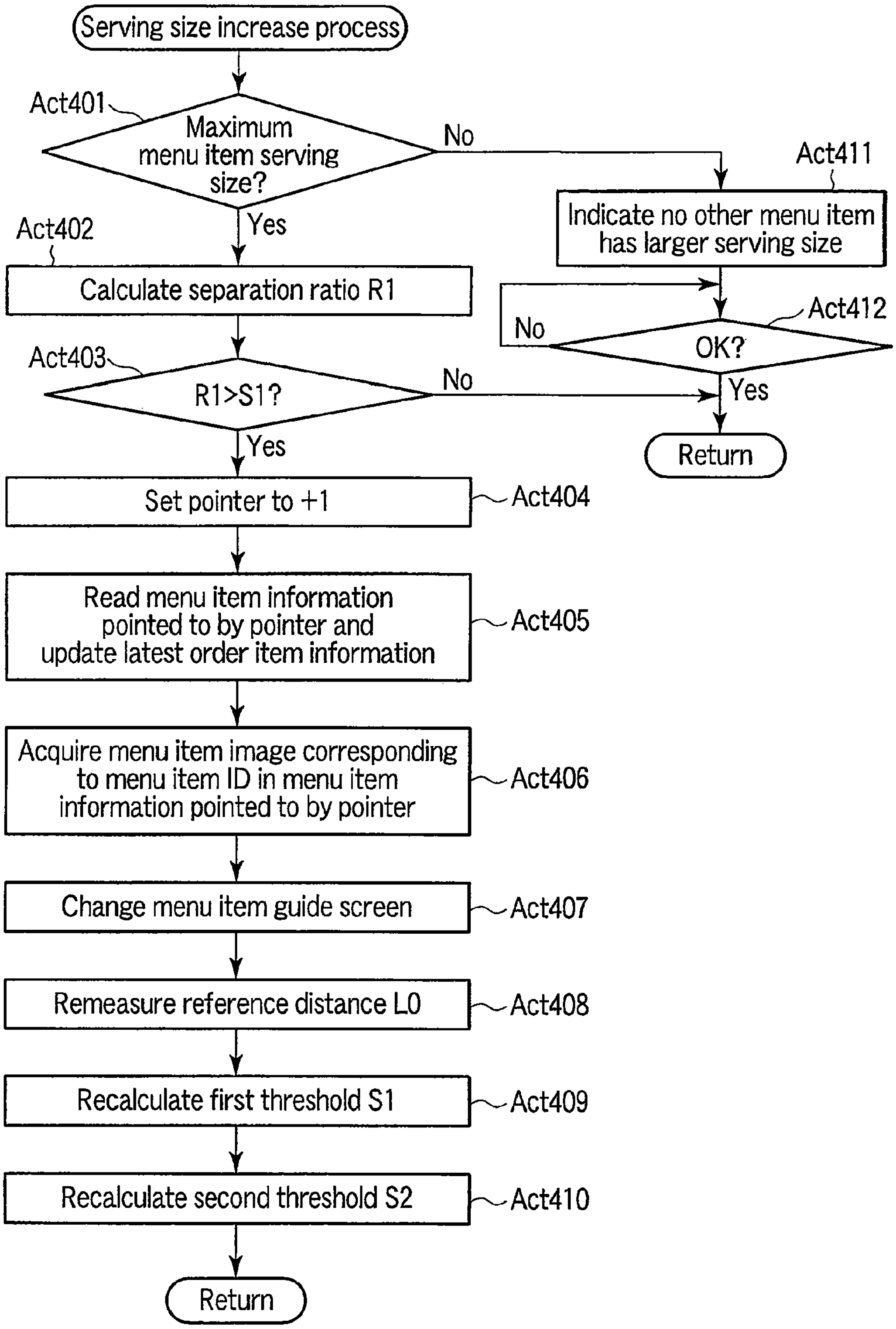
FIG. 7 is a flowchart specifically showing the procedure of a serving size increase process in FIG. 6.
Figure 8:
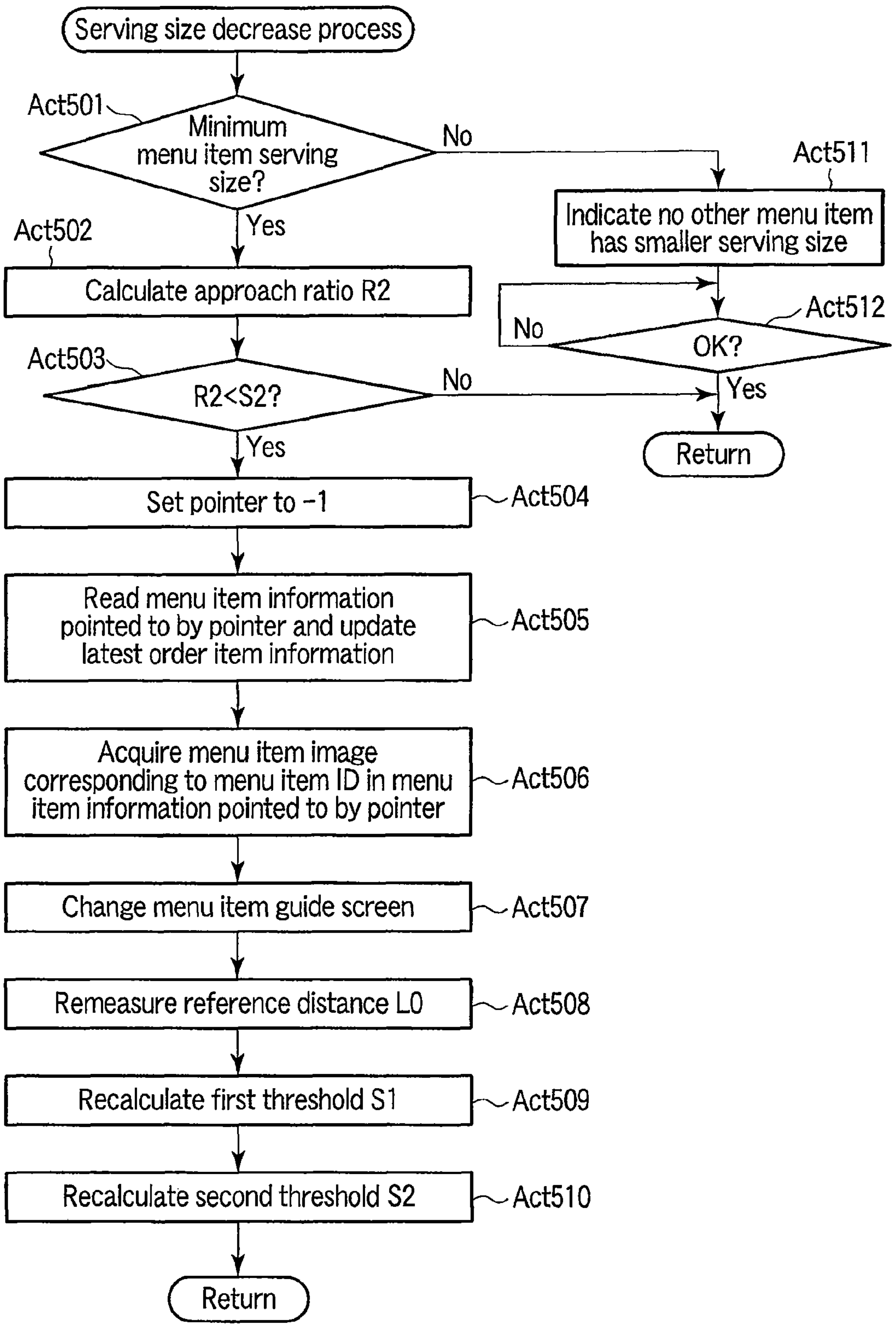
FIG. 8 is a flowchart specifically showing a serving size decrease process in FIG. 6.

FIGS. 6 to 8 are flowcharts specifically showing the procedure of the above-described serving size change process. The CPU starts the process when a serving size change is permitted for the menu item selected from the menu screen 60, that is, menu item X for which an order has been accepted.

First, the CPU 11 determines whether or not two points in the menu item image display region 71 in the menu item guide screen 70 have been touched (Act 31 of FIG. 6). When the touch panel controller 15 analyzes a signal from the touch panel sensor 22 to sense that two points in the menu item image display region 71 have been touched, the CPU 11 determines that two points have been touched. If two points have not been touched (NO in Act 31), the CPU 11 returns to the process in Act 14.

When two points in the menu item image display region 71 are touched (YES in Act 31), the CPU 11 calculates the distance between the two points. The CPU 11 then stores the distance between the two points in the RAM 13 as a reference distance L0.

The CPU 11 calculates a first threshold S1 according to Equation (1) (Act 33 of FIG. 6).

$$S1=P2/P1 \tag{1}$$

In Equation (1), variable P1 denotes the serving size ratio of menu item X. Variable P2 is the serving size ratio of a menu item XL which is of the same type as that of menu item X but is greater than menu item X by one level.

The CPU 11 calculates a second threshold S2 according to Equation (2) (Act 34 of FIG. 6).

$$S2=P0/P1 \tag{2}$$

In Equation (2), variable P1 denotes the serving size ratio of menu item X. Variable P0 is the serving size ratio of a menu item XL which is of the same type as that of menu item X but is less than menu item X by one level.

For example, it is assumed that the medium orange juice is menu item X as shown in the menu item guide screen 70 in FIG. 13. The serving size ratio of the menu item "orange juice" is such that small, medium, and large are 1, 1.6, and 2.3, as indicated in the data in the menu item information 32 shown in FIG. 2.

In this case, the first threshold S1 is calculated to be 1.44 according to Equation (1). The second threshold S2 is calculated to be 0.63 by according to Equation (2). The CPU 11 stores the first threshold S1 and the second threshold S2 in the RAM 13. The order in which the first threshold S1 and the second threshold S2 are calculated is not limited to the one according to the present embodiment. The second threshold S2 may be calculated before the first threshold S1 is calculated.

When the first and second thresholds S1 and S2 are stored, the CPU 11 monitors the touch panel controller 15 (Act 35 of FIG. 6). Here, when the touch panel controller 15 senses a change in the two touch points based on a signal from the touch panel sensor 22, the CPU 11 determines whether or not the distance between the two points has increased (Act 36 of FIG. 6), whether or not the distance between the two points has decreased (Act 37 of FIG. 6), and whether or not the touch with the two points has been lost (Act 38 of FIG. 6).

If the touch with the two points has been lost (YES in Act 38), the CPU 11 returns to the process in Act 14.

If the distance between the two points has increased (YES in Act 36), the CPU 11 executes a serving size increase process specifically shown in FIG. 7 (Act 40 of FIG. 6).

First, the CPU 11 determines whether or not the menu item with its image displayed in the menu item image display region 71 in the menu item guide screen 70 has the largest serving size among the menu items of this same type (Act 401 of FIG. 7).

For example, for the menu item "orange juice", neither small nor medium is the largest serving size among the menu items of this type. In this case (NO in Act 401), the CPU 11 measures the distance L1 between the two points. Then, the CPU calculates ratio R1 of the distance L1 to the reference distance L0 according to Equation (3) (Act 402 of FIG. 7). Ratio R1 is hereinafter referred to as the separation ratio.

$$R1=L1/L0 \tag{3}$$

The CPU 11 compares the separation ratio R1 with the first threshold S1 (Act 403 of FIG. 7). If, as a result, the separation ratio R1 is less than or equal to the first threshold S1 (NO in Act 403), the CPU 11 returns to the process of monitoring the touch panel controller 15 (Act 35 of FIG. 6).

In contrast, when the separation ratio R1 is greater than the threshold S1 (YES in Act 403), the CPU 11 determines that enlargement of the menu item image has been specified. Here, the CPU 11 executes the processes in Acts 401, 402, and 403 to implement the functions of the enlargement instruction section 114.

When enlargement of the menu item image is specified, the CPU 11 moves the pointer pointing to the menu item information in the menu item information file 32 by an amount equal to one record in an increment direction (Act 404 of FIG. 7).

Then, the CPU 11 reads the menu item information pointed to by the pointer from the menu item information file 32. The CPU 11 then rewrites the menu item ID, serving size, and price in the latest order item information in the order information record to those in the newly read menu item information (Act 405 of FIG. 7). Here, the CPU 11 executes the processes in Acts 404 and 405 to implement the functions of the enlargement processing section 117.

Then, the CPU 11 searches the menu item image file 33 in order to read the image data stored in association with the menu item ID in the menu item information pointed to by the pointer (Act 406 of FIG. 7). Then, based on the image data read from the menu item image file 33 and the menu item information read from the menu item information file 32 as a result of the process in Act 405, the CPU 11 changes the menu item image and menu item information in the currently displayed menu item guide screen 70 (Act 407 of FIG. 7). Here, the CPU 11 executes the processes in Acts 406 and 407 to implement the functions of the enlargement switching section 116.

Figure 16:
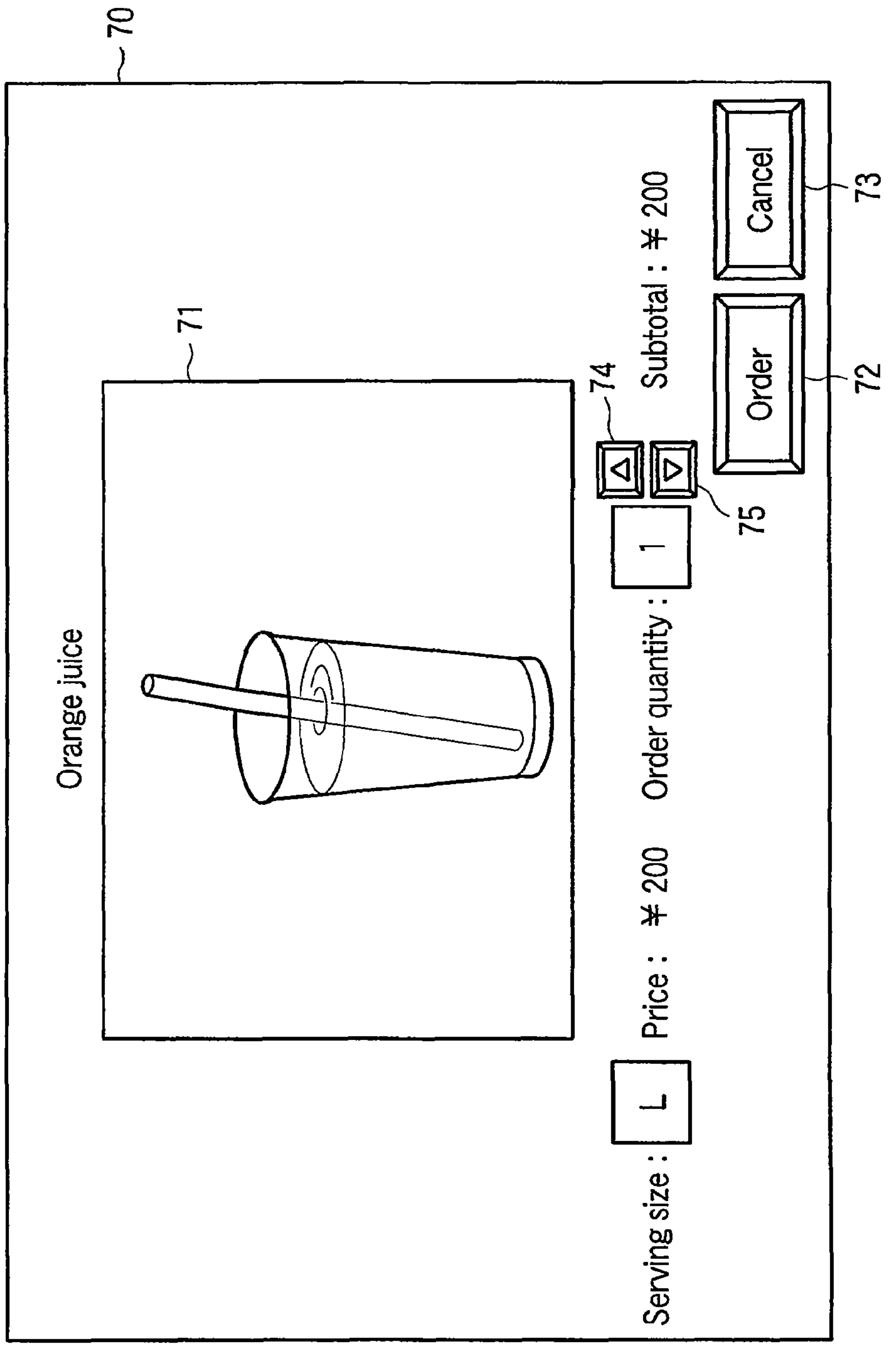
FIG. 16 is a diagram showing an example of the menu item guide screen showing an enlarged image of a menu item shown in FIG. 13.

It is assumed that a customer touches any two points in the menu item image display region 71 in the menu item guide screen 70 in FIG. 13 and increases the distance between the points by a factor of 1.44, which corresponds to the first threshold S1. Then, the pointer pointing to the menu item information on the medium orange juice is moved so as to point to the menu item information on the large orange juice. As a result, as shown in FIG. 16, the image in the menu item image display region 71 is switched to a menu item image of the large orange juice. The menu item information including the serving size and the price is also switched to the information on the large orange juice.

After the menu item guide screen 70 is changed, the CPU 11 remeasures the current distance between the two touch points. The CPU 11 then overwrites the reference distance L0 in the RAM 13 with the measured distance between the two points (Act 408 of FIG. 7).

Then, the CPU 11 uses the new reference distance L0 to recalculate the first threshold S1 according to Equation (1), as described above (Act 409 of FIG. 7). Similarly, the CPU 11 recalculates the second threshold S2 according to Equation (2), as described above (Act 410 of FIG. 7).

For example, it is assumed that the menu item guide screen 70 is changed to the one for the large orange juice as shown in FIG. 16. In this case, since no other menu item has a serving size larger than that of the large orange juice by one level, the first threshold S1 is infinite. The serving size ratio of the large orange juice is 2.3, and the serving size ratio of the medium orange juice is 1.6. Thus, the second threshold S2 is calculated to be 0.70 according to Equation (2), as described above.

The CPU 11 stores the first and second thresholds S1 and S2 in the RAM 13. Thereafter, the CPU 11 returns to the process of monitoring the touch panel controller 15 (Act 35 of FIG. 6).

When the menu item corresponding to the image in the menu item image display region 71 has the largest serving size among the menu items of this same type (YES in Act 401), the CPU 11 allows the display 21 to show an error message screen 100 indicating that no menu item with a serving size larger than the currently displayed one can be ordered.

Figure 17:
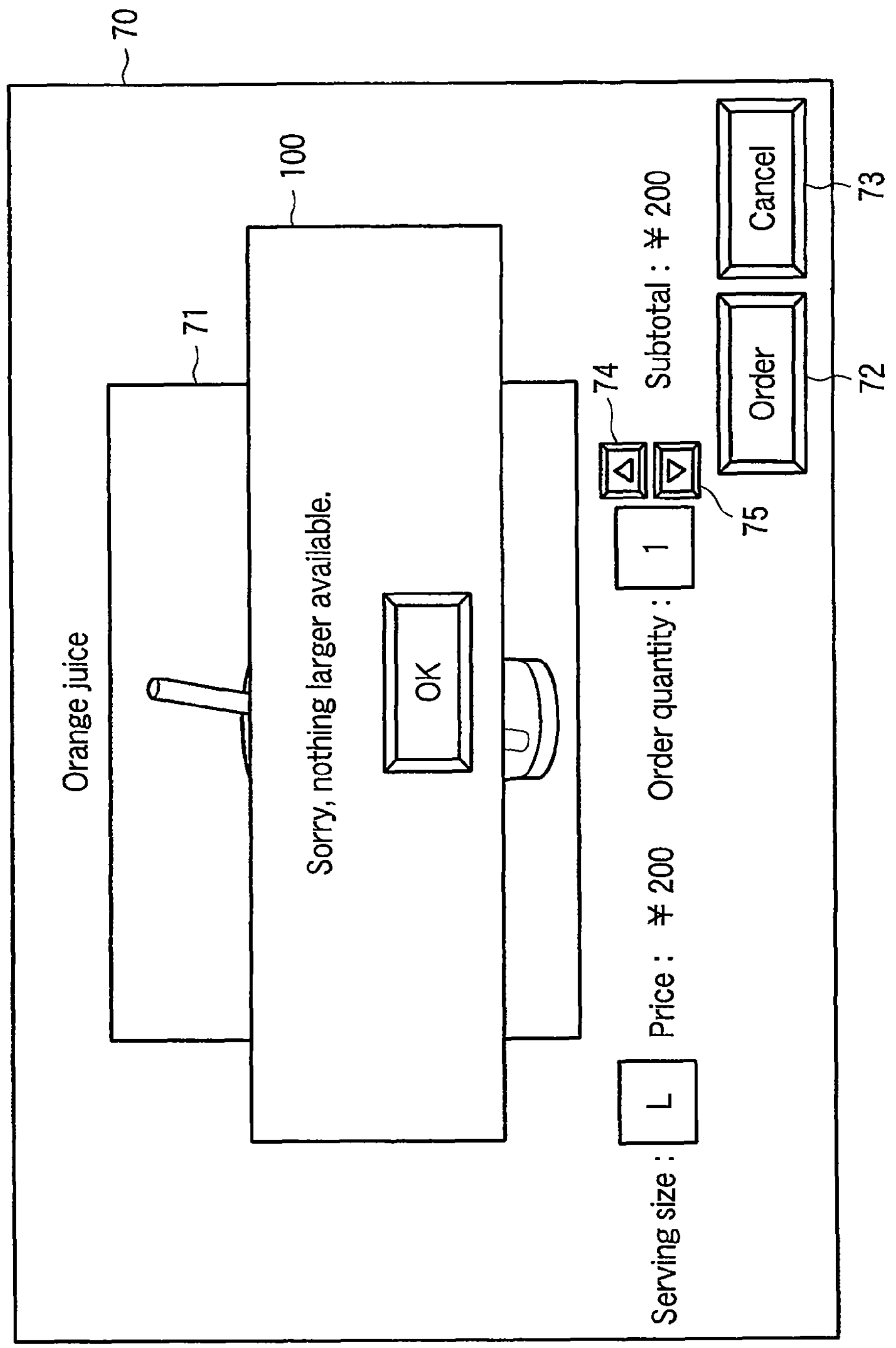
FIG. 17 is a diagram showing an example of an error message screen shown on the display according to the first embodiment.

FIG. 17 shows an example of the error message screen 100. As shown in FIG. 17, the CPU 11 allows the error message screen 100 with an OK button 101 to be superimposedly displayed over the menu item guide screen 70.

When the error message screen 100 is displayed, the CPU 11 waits for the OK button 101 to be activated (Act 412 of FIG. 7). When the OK button 101 is touched (YES in Act 412), the CPU 11 returns to the process of monitoring the touch panel controller 15 (Act 35 of FIG. 6).

The description will be continued referring to FIG. 6 again. Upon determining, through the monitoring of the touch panel controller 15, that the distance between the two points has decreased (YES in Act 37), the CPU 11 executes a serving size decrease process specifically shown in FIG. 8 (Act 50 of FIG. 6).

First, the CPU 11 determines whether or not the menu item with its image displayed in the menu item image display region 71 in the menu item guide screen 70 has the smallest serving size among the menu items of this same type (Act 50 of FIG. 8).

For example, for the menu item "orange juice", neither medium nor large is the largest serving size among the menu items of this type. In this case (NO in Act 501), the CPU 11 measures the distance L2 between the two points. Then, the CPU calculates ratio R2 of the distance L2 to the reference distance L0 according to Equation (4) (Act 502 of FIG. 8). Ratio R2 is hereinafter referred to as the approach ratio.

$$R2=L2/L0 \tag{4}$$

The CPU 11 compares the approach ratio R2 with the second threshold S2 (Act 503 of FIG. 8). If, as a result, the approach ratio R2 is greater than or equal to the second threshold S2 (NO in Act 503), the CPU 11 returns to the process of monitoring the touch panel controller 15 (Act 35 of FIG. 6).

In contrast, if the approach ratio R2 is less than the second threshold S2 (YES in Act 503), the CPU 11 determines that reduction of the menu item image has been specified. Here, the CPU 11 executes the processes in Acts 501, 502, and 503 to implement the functions of the reduction instruction section 115.

When reduction of the menu item image is specified, the CPU 11 moves the pointer pointing to the menu item information in the menu item information file 32 by an amount equal to one record in a decrement direction (Act 504 of FIG. 8).

Then, the CPU 11 reads the menu item information pointed to by the pointer from the menu item information file 32. The CPU 11 then rewrites the menu item ID, serving size, and price in the latest order item information in the order information record to those in the newly read menu item information (Act 505 of FIG. 8). Here, the CPU 11 executes the processes in Acts 504 and 505 to implement the functions of the reduction processing section 119.

Then, the CPU 11 searches the menu item image file 33 in order to read the image data stored in association with the menu item ID in the menu item information pointed to by the pointer (Act 506 of FIG. 8). Then, based on the image data read from the menu item image file 33 and the menu item information read from the menu item information file 32 as a result of the process in Act 505, the CPU 11 changes the menu item image and menu item information in the currently displayed menu item guide screen 70 (Act 507 of FIG. 8). Here, the CPU 11 executes the processes in Acts 506 and 507 to implement the functions of the reduction switching section 118.

It is assumed that a customer touches any two points in the menu item image display region 71 in the menu item guide screen 70 in FIG. 13 and reduces the distance between the points by a factor of 0.63, which corresponds to the second threshold S2. Then, the pointer pointing to the menu item information on the medium orange juice is moved so as to point to the menu item information on the small orange juice. As a result, the image in the menu item image display region 71 is switched to a menu item image of the small orange juice. The menu item information including the serving size and the price is also switched to the information on the small orange juice.

After the menu item guide screen 70 is changed, the CPU 11 remeasures the current distance between the two touch points. The CPU 11 then overwrites the reference distance L0 in the RAM 13 with the measured distance between the two points (Act 508 of FIG. 8).

Then, the CPU 11 uses the new reference distance L0 to recalculate the first threshold S1 according to Equation (1), as described above (Act 509 of FIG. 8). Similarly, the CPU 11 recalculates the second threshold S2 according to Equation (2), as described above (Act 510 of FIG. 8).

For example, it is assumed that the menu item guide screen 70 is changed to the one for the small orange juice. In this case, since no other menu item has a serving size smaller than that of the small orange juice by one level, the second threshold S2 is 0. The serving size ratio of the small orange juice is 1, and the serving size ratio of the medium orange juice is 1.6. Thus, the first threshold S1 is calculated to be 1.6 according to Equation (2), as described above.

The CPU 11 stores the first and second thresholds S1 and S2 in the RAM 13. Thereafter, the CPU 11 returns to the process of monitoring the touch panel controller 15 (Act 35 of FIG. 6).

When the menu item corresponding to the image in the menu item image display region 71 has the smallest serving size among the menu items of this same type (YES in Act 501), the CPU 11 allows the display 21 to show the error message screen 100 indicating that no menu item with a serving size smaller than the currently displayed one can be ordered. The CPU 11 allows the error message screen 100 with the OK button 101 to be superimposedly displayed over the menu item guide screen 70.

When the error message screen 100 is displayed, the CPU 11 waits for the OK button 101 to be activated (Act 512 of FIG. 8). When the OK button 101 is touched (YES in Act 512), the CPU 11 returns to the process of monitoring the touch panel controller 15 (Act 35 of FIG. 6).

The order taking terminal 1 is installed on each table in the restaurant. In an idle state, the display 21 of the order taking terminal 1 shows the category selection screen 50 (FIG. 11). Upon sitting at the table, a customer first touches the button 52 in the category selection screen 50 which displays the desired category, for example, "drinks".

Then, the display 21 shows the menu screen 60 (FIG. 12) for the menu items belonging to the category "drinks". The customer touches a menu button 61C on which an image of the desired menu item, for example, "orange juice" is displayed.

Then, the display 21 shows the menu item guide screen 70 (FIG. 13) for the medium orange juice. The customer then indicates whether they are happy with medium or want to change the serving size.

If the customer is happy with medium, they touch the order button 72. Then, the order item information on the medium orange juice is added to the order information record. The order list screen 80 (FIG. 14) is displayed.

To change to large, the customer touches the inside of the menu item image display region 71 with finger and thumb, and then spreads their finger and thumb on the screen. Then, the screen on the display 21 switches to the menu item guide screen 70 (FIG. 16) for the large orange juice.

To order the large orange juice, the customer temporarily lifts their finger and thumb from the screen and touches the order button 72. Then, the order item information on the large orange juice is added to the order information record.

In contrast, if the customer has second thoughts and wishes to stick with medium, they bring their finger and thumb slightly together on the screen. Then, the screen on the display 21 returns to the menu item guide screen 70 (FIG. 13) for the medium orange juice.

To order the medium orange juice, the customer temporarily lifts their finger and thumb from the screen and touches the order button 72. Then, the order item information on the medium orange juice is added to the order information record.

In contrast, to change to small, the customer brings their finger and thumb closer together. Then, the screen on the display 21 switches to the menu item guide screen 70 for the small orange juice.

To order the small orange juice, the customer temporarily lifts their finger and thumb from the screen and touches the order button 72. Then, the order item information on the small orange juice is added to the order information record.

To stop ordering the orange juice, the customer may touch the cancel button 73 on the menu item guide screen 70.

As described above, in the first embodiment, when the image of the menu item displayed in the menu item image display region 71 in the menu item guide screen 70 is enlarged, the order taking terminal 1 rewrites the order item information to information on a menu item which is of the same type as that of the currently displayed menu item but has a serving size larger than that of the currently displayed menu item. Similarly, when the menu item image is reduced, the order taking terminal 1 rewrites the order item information to information on a menu item which is of the same type as that of the currently displayed menu item but has a serving size smaller than that of the currently displayed menu item. Thus, the customer can visually intuitively determine the difference between the menu items of the same type.

In the first embodiment, the order taking terminal 1 calculates the first threshold S1 and the second threshold S2 from the serving size ratio of the menu items of the same type. However, this is not the only method for calculating the thresholds S1 and S2. For example, the order taking terminal 1 may calculate the first threshold S1 by multiplying the reference distance L1 by an appropriate integer and calculate the second threshold by dividing the reference distance L1 by an appropriate integer. Alternatively, the order taking terminal 1 may preset the thresholds S1 and S2 to fixed values. In this case, the order taking terminal 1 may set the thresholds S1 and S2 for each menu item or set thresholds S1 and S2 that are common to all the menu items.

Second Embodiment

In the description of the first embodiment, the serving size of a menu item is changed. In the second embodiment, the serving size of an ingredient of a menu item is changed.

In the second embodiment, an order taking terminal 1 has a hardware configuration common to the first embodiment. However, a menu item information file 32 and data stored in a menu item image file are different from those in the first embodiment.

FIG. 18 shows an example of data stored in a menu item information file 32. For the menu items "special burger" and "avocado burger", which belong to the category "hamburgers", the serving size of each ingredient such as patty, tomato, salad, or cheese can be changed.

In the second embodiment, a system administrator (for example, a restaurant manager) sets an ingredient ID and a price for each of the ingredients with different quantities. Furthermore, for each of the ingredients with different serving sizes, the system administrator sets a serving size ratio that is the ratio of each serving size obtained when the minimum serving size for the same ingredient is set to 1, which corresponds to a reference. The reference serving size is not limited to the minimum serving size. The maximum serving size may be set to be a reference so that the minimum and intermediate serving size ratios can be determined. Alternatively, the intermediate serving size may be set to be a reference so that the maximum and minimum serving size ratios can be determined.

FIG. 19 shows an example of data stored in a menu item image file 33. The data in FIG. 19 corresponds to a part of the illustrated ingredients in the menu item information file 32 in FIG. 18. That is, the menu item image file 33 is configured to store, for each ingredient ID, image data on the ingredient specified by the ingredient ID.

When an order taking program is started, the CPU 11 starts a process that proceeds as shown in the flowchart in FIGS. 4 and 5 as is the case with the first embodiment. However, the process according to the second embodiment is different from that according to the first embodiment in a portion corresponding to Acts 9 to 11 in the first embodiment.

In the second embodiment, the CPU 11 writes the menu item ID and name of a menu item, the ingredient ID, name, and serving size of each ingredient, the sum of the prices of the ingredients, and an initial order quantity of 1 in the order information record as new order item information (Act 9); all these data are contained in the menu item information read from the menu item information file 32.

Furthermore, the CPU 11 searches the menu item image file 33 in order to read image data stored in association with each of the ingredient IDs in the menu item information (Act 10). Then, based on an image obtained by combining the image data read from the menu item image file 33 and menu item information read from the menu item information file 32, the CPU 11 creates a menu item guide screen 70 and allows the display 21 to show the menu item guide screen 70 (Act 11).

Figure 21:
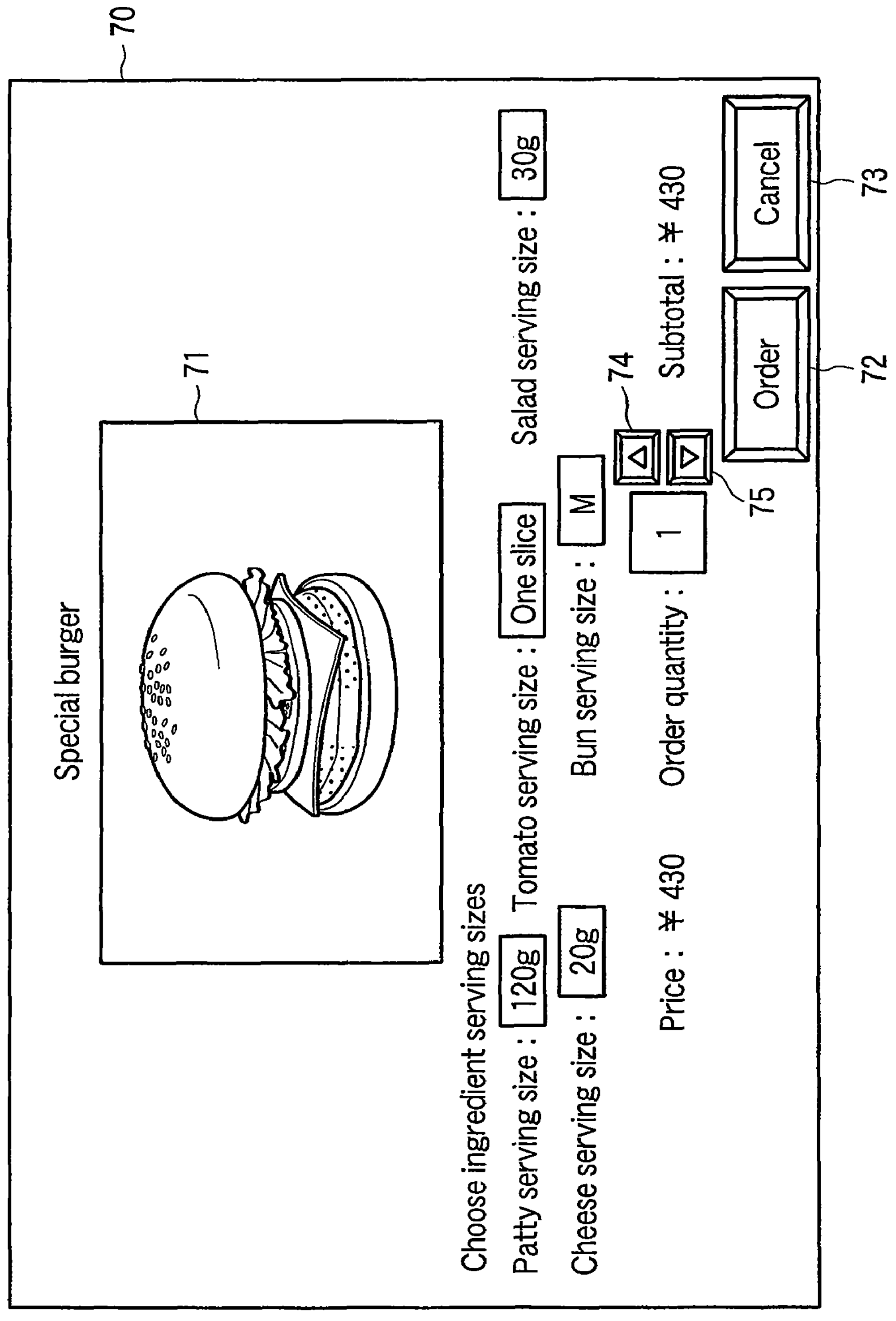
FIG. 21 is a diagram showing an example of a menu item guide screen shown on the display according to the second embodiment.

FIG. 20 shows an example of an order information record in which order item information is written. FIG. 21 shows an example of the menu item guide screen 70 displayed when the order item information in FIG. 20 is written in the order information record.

An image of the menu item "special burger" is displayed in a menu item image display region 71 in the menu item guide screen 70; the special burger consists of a 120-gram patty, a slice of tomato, a 20-gram slice of cheese, 30 grams of salad, and a medium-sized bun (FIG. 21).

Figure 22:
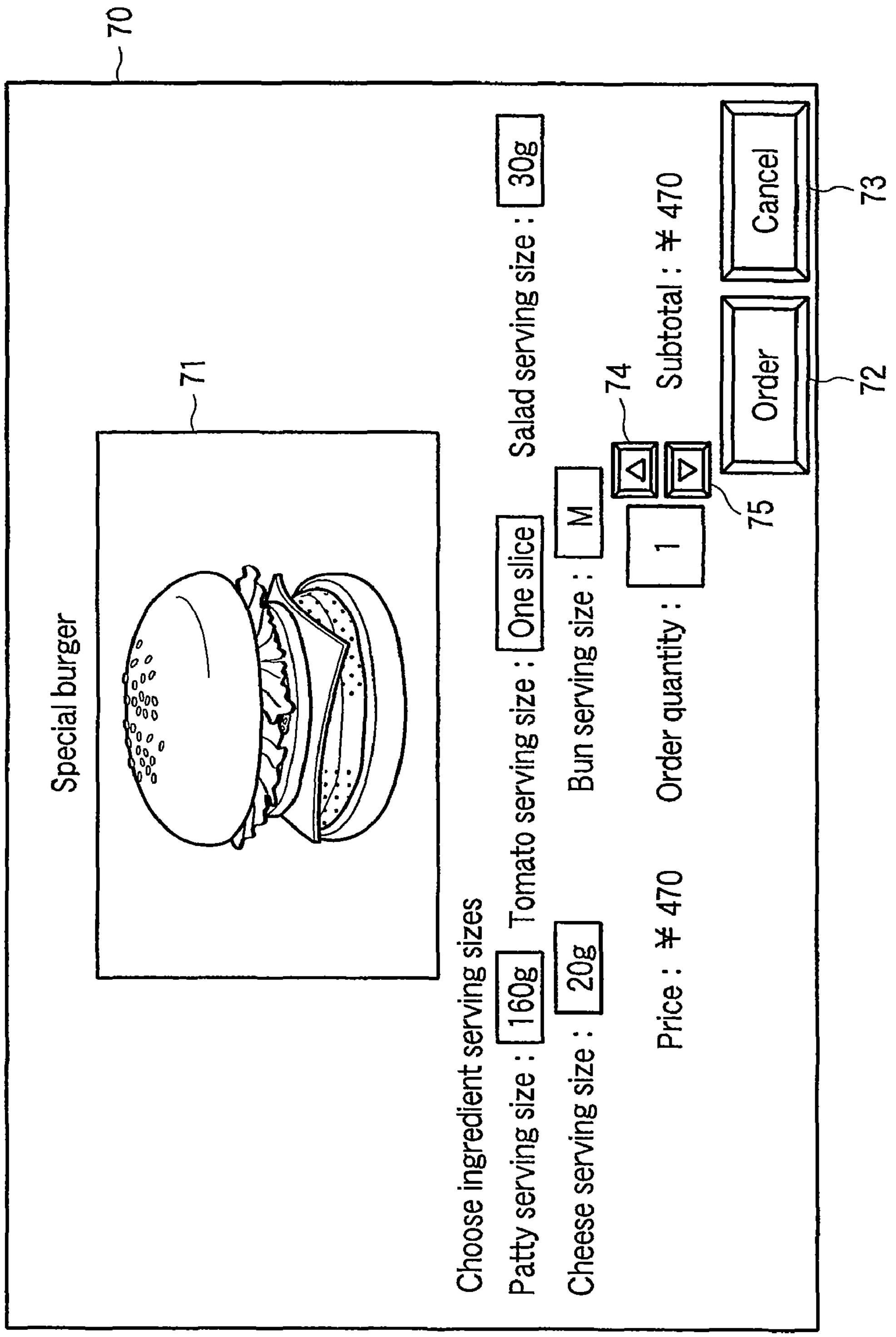
FIG. 22 is a diagram showing an example of the menu item guide screen showing an enlarged image of a menu item shown in FIG. 21.

It is assumed that in this state, a customer touches the portion of the ingredient "patty" with finger and thumb, and then spreads their finger and thumb. Then, when the separation ratio R1 is greater than a first threshold S1 calculated from the serving size ratio of the 120-gram patty to the 160-gram patty, the serving size of the ingredient "patty" in the order item information is changed to 160 grams. Furthermore, the image of the menu item is changed to an image containing a 160-gram patty as shown in FIG. 22.

In contrast, if the customer brings their finger and thumb together, when the approach ratio R2 is less than a second threshold S2 calculated from the serving size ratio of the 120-gram patty to the 80-gram patty, the serving size of the ingredient "patty" in the order item information is changed to 80 grams. Furthermore, the image of the menu item is changed to an image containing an 80-gram patty.

For each of the other ingredients, for example, tomato, salad, cheese, and bun, the customer can change the serving size of the ingredient by touching the screen with finger and thumb, and then spreading or bringing together their finger and thumb. Furthermore, the serving size of the ingredient in the menu item image is correspondingly changed.

As described above, in the second embodiment, the customer can visually appreciate the differences between the quantities of the ingredients forming the menu item.

Third Embodiment

In the above-described first and second embodiments, a touch input section comprising the touch panel sensor 15 is illustrated as an information input section configured to instruct enlargement or reduction of a menu item image. In the third embodiment, a rotational input section comprising a wheel 24 is used instead of the contact input section.

Figure 23:
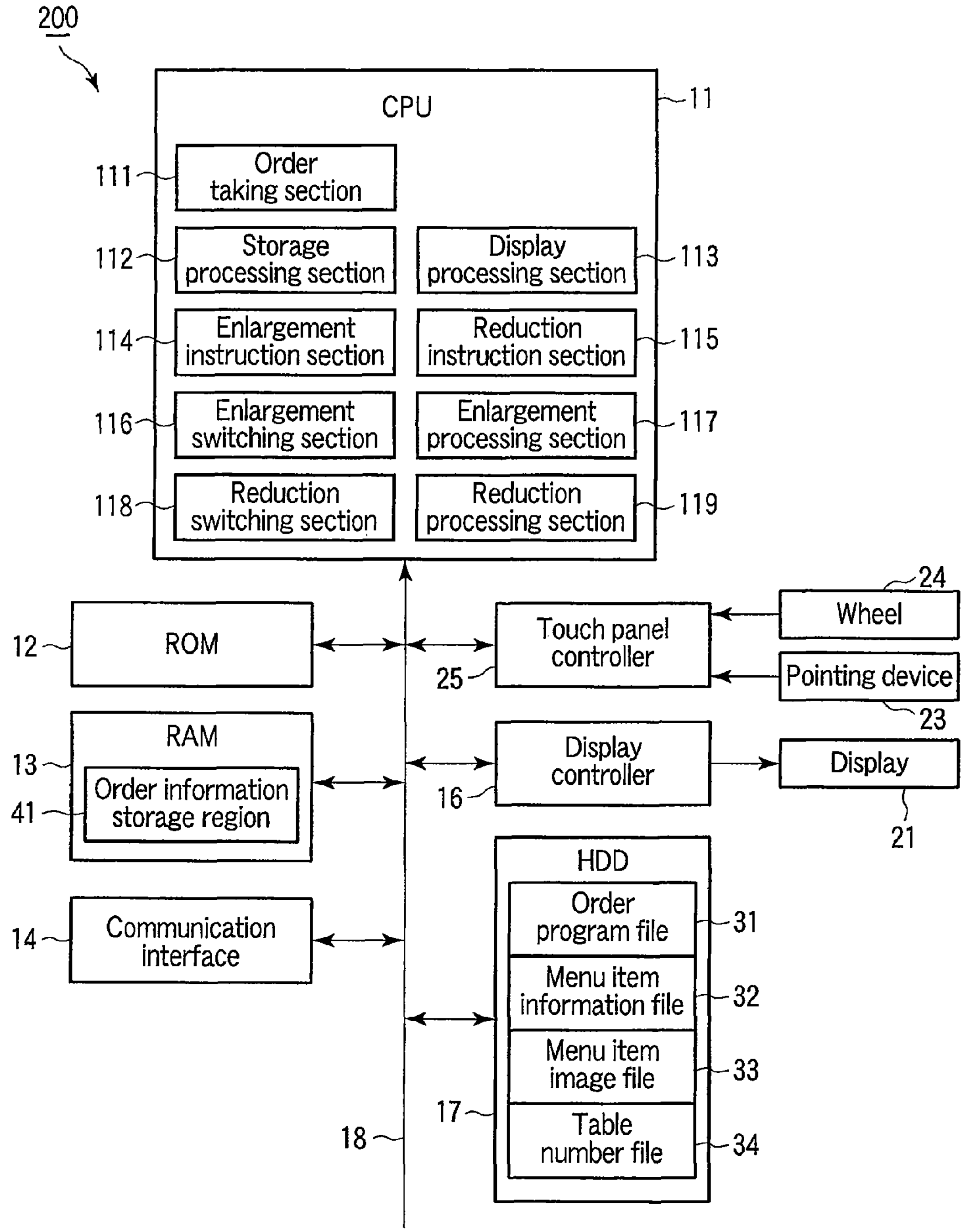
FIG. 23 is a block diagram of an order taking terminal according to a third embodiment.

FIG. 23 is a block diagram of an order taking terminal 200 according to a third embodiment. Components of the order taking terminal 200 which are common to FIG. 1 are denoted by the same reference numerals as those in FIG. 1. The order taking terminal 200 comprises a pointing device 23, the wheel 24, and a device interface 25. The device interface 25 receives signals from the pointing device 23 and the wheel 24 and provides the signals to the CPU 11.

The pointing device 23 is configured to input coordinate positions on a screen of a display 21. The wheel 24 is a device configured to detect the degree of rotation in two one-dimensional directions (in the third embodiment, an upward direction and a downward direction) and to consider the degree of rotation to be input of information. The wheel 24 forms a rotational input section. The pointing device 23 and the wheel 24 are included in, for example, a mouse.

Also in the order taking terminal 200 configured as described above, when an order taking program is started, the CPU 11 starts a process that proceeds as shown in the flowchart in FIGS. 4 and 5. In this procedure, the serving size change process in Act 13 according to the third embodiment is different from that according to the first embodiment.

Figure 24:
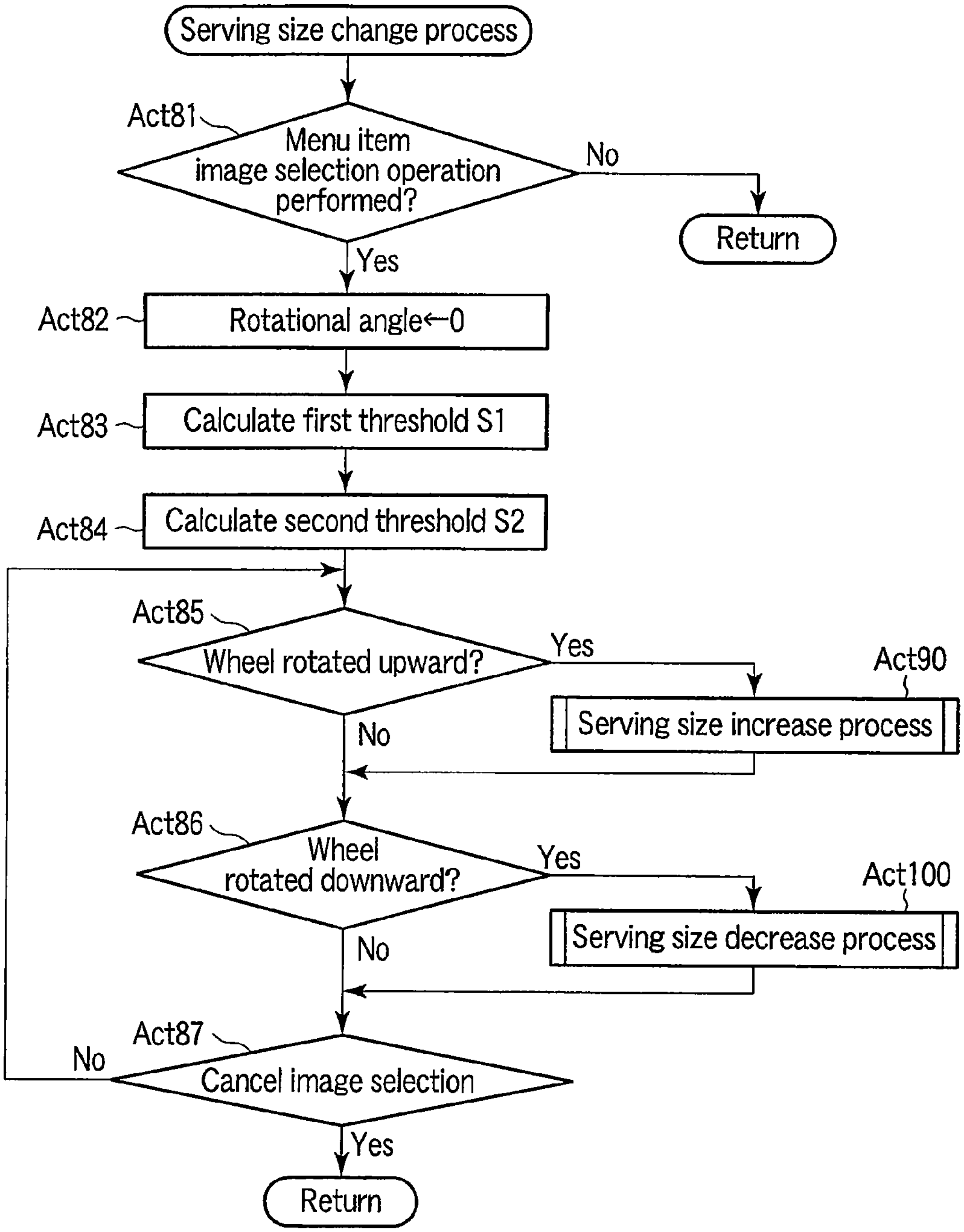
FIG. 24 is a flowchart specifically showing the procedure of a serving size change process according to a third embodiment.
Figure 25:
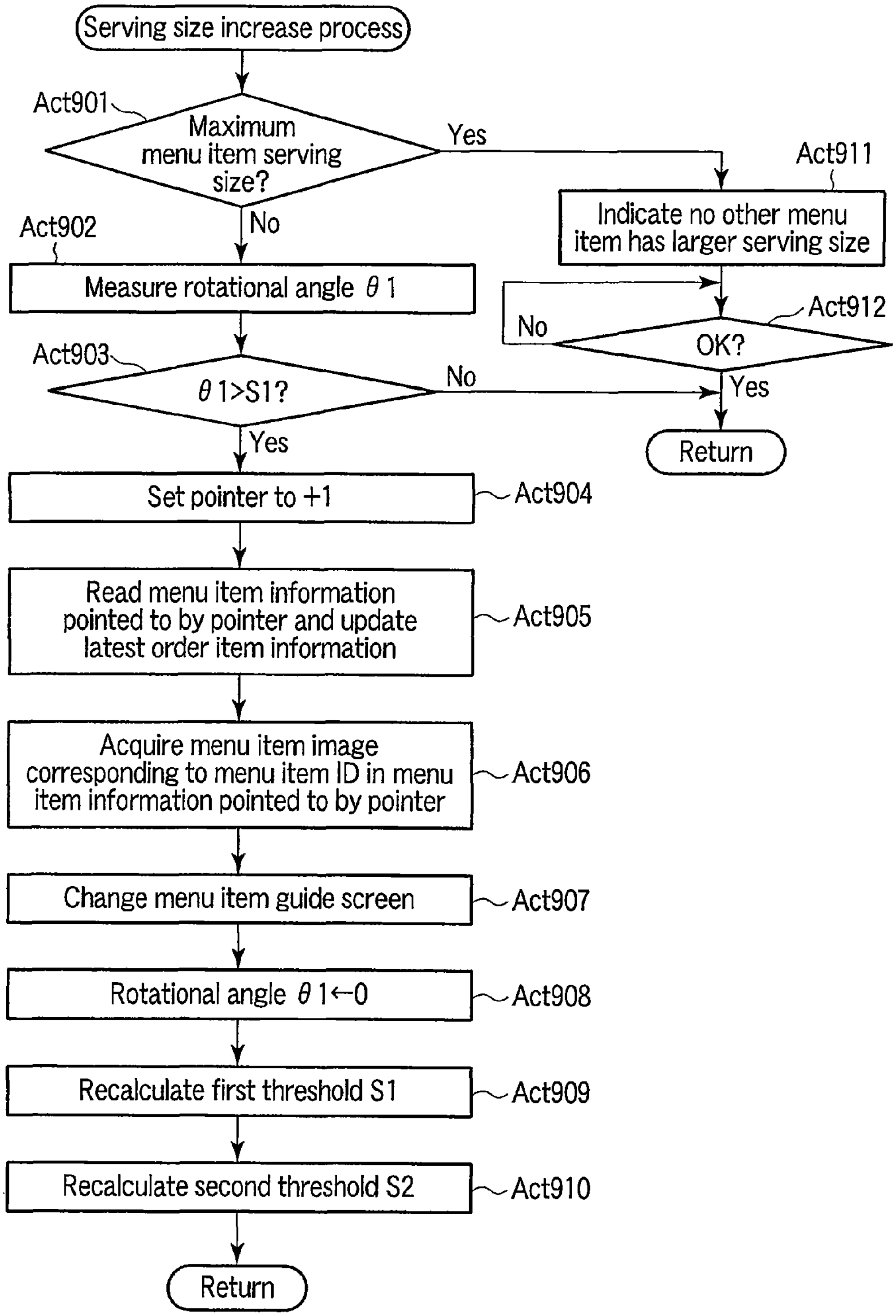
FIG. 25 is a flowchart specifically showing the procedure of a serving size increase process in FIG. 24.
Figure 26:
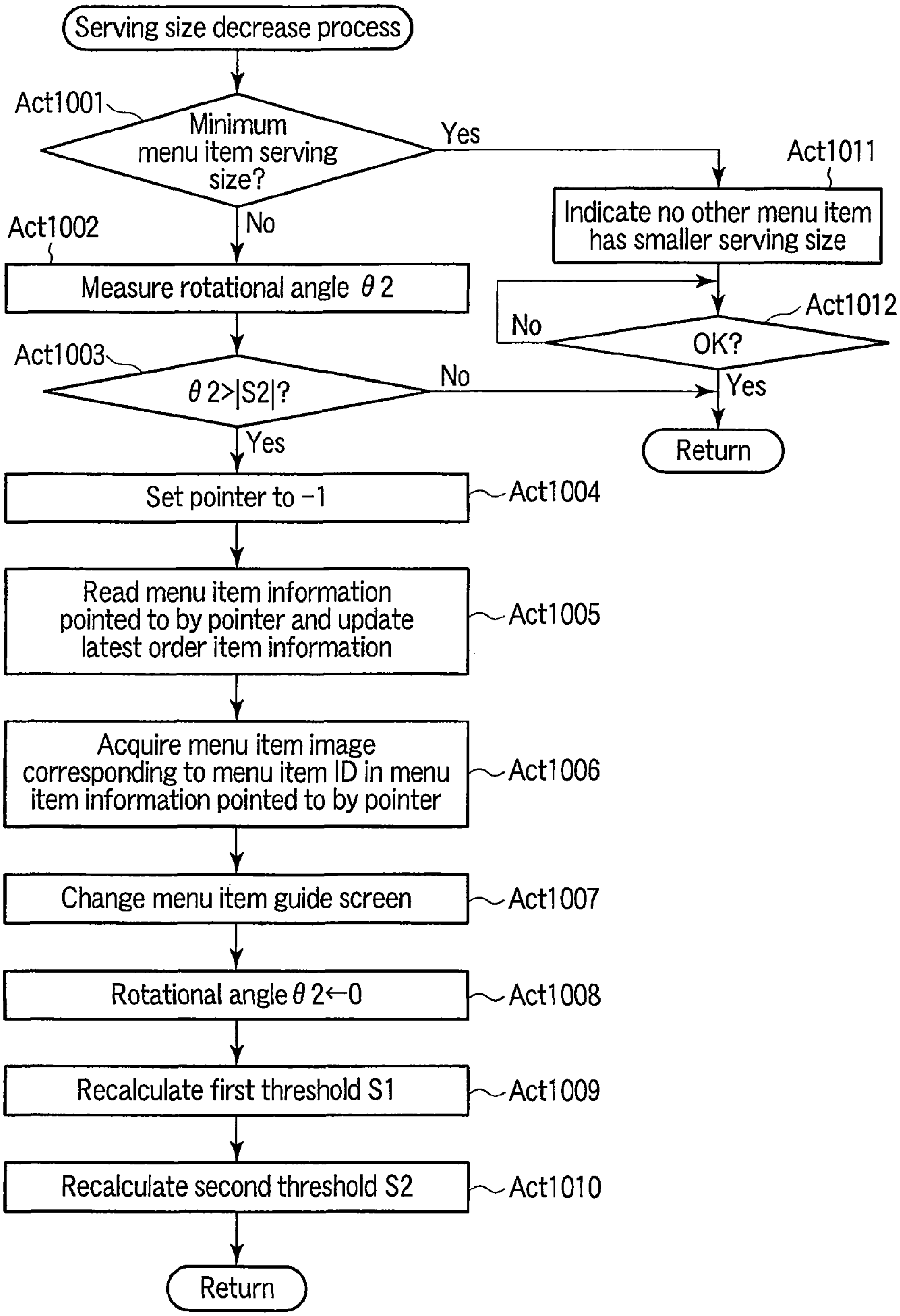
FIG. 26 is a flowchart specifically showing the procedure of a serving size decrease process in FIG. 24.

FIGS. 24 to 26 are flowcharts showing the procedure of a serving size change process according to the third embodiment. The CPU 11 starts this process when a serving size change is permitted for a menu item selected from a menu screen 60, that is, menu item X for which an order has been accepted.

First, the CPU 11 determines whether or not the menu item image displayed in the menu item image display region 71 in the menu item guide screen 70 has been selected (Act 81 of FIG. 24). Upon receiving a signal from the pointing device 23 indicating the coordinate position on the menu item image, the CPU 11 determines the menu item image to have been selected. If the menu item image has not been selected (NO in Act 81), the CPU 11 returns to the process in Act 14 in FIG. 5.

When the menu item image is selected (YES in Act 81), the CPU 11 resets the rotational angle data on the wheel 24 to zero. The rotational angle data is stored in the RAM 13.

The CPU 11 calculates a first threshold S1 and a second threshold S2 (Acts 83 and 84 of FIG. 24). A method for calculating the first threshold S1 and the second threshold S2 is the same as the processes in Acts 3 and 34 according to the first embodiment. However, in the third embodiment, the CPU 11 converts the thresholds S1 and S2 to angles of rotation for storage.

In an example of the conversion method, the numerical value 1 is defined as an angle of zero. As the value of each of the thresholds S1 and S2 increases by 0.1, the angle is increased by 1 degree. In contrast, as the value of each of the thresholds S1 and S2 decreases by 0.1, the angle is reduced by 1 degree.

For the menu item "orange juice", as shown in the data in the menu item information file 32 in FIG. 2, small is 1, medium is 1.6, and large is 2.3. Thus, the first threshold S1 is calculated to be 1.44 according to Equation (1). The second threshold S2 is calculated to be 0.63 according to Equation (2). As a result, the first threshold S1 is converted to an angle of 44°. The second threshold S2 is converted to an angle of −47°.

When the first and second thresholds S1 and S2 are stored, the CPU 11 monitors a signal from the pointing device 23 and the wheel 24 (Act 85 of FIG. 24). Upon receiving a signal, the CPU 11 determines whether an upward rotation signal has been input through the wheel 24 (Act 86 of FIG. 24), a downward rotation signal has been input through the wheel 24 (Act 87 of FIG. 24), or a signal indicating a site other than that of the menu item image has been input through the pointing device 23 (Act 88 of FIG. 24).

If a signal indicating a site other than that of the menu item image is input through the pointing device (Yes in Act 88), the CPU 11 returns to the process in Act 14.

If an upward rotation signal is input through the wheel 24 (YES in Act 86), the CPU 11 executes a serving size increase process specifically shown in FIG. 25 (Act 90 of FIG. 24).

First, the CPU 11 determines whether or not the menu item with its image displayed in the menu item image display region 71 in the menu item guide screen 70 has the largest serving size among the menu items of this same type (Act 901 of FIG. 25). If the menu item does not have the largest serving size (NO in Act 901), the CPU 11 measures the upward rotational angle θ1 of the wheel 24 (Act 902 of FIG. 25).

CPU 11 compares the rotational angle θ1 with the first threshold S1 converted to a corresponding angle (Act 903 of FIG. 25). As a result, if the rotational angle θ1 is less than or equal to the first threshold S1 (NO in Act 903), the CPU 11 returns to the process of monitoring the signal (Act 85 of FIG. 24).

In contrast, when the rotational angle θ1 is greater than the first threshold S1 (YES in Act 903), the CPU 11 determines that enlargement of the menu item image has been specified. Here, the CPU 11 executes the processes in Acts 901, 902, and 903 to implement the functions of an enlargement instruction section 114.

When enlargement of the menu item image is specified, the CPU 11 executes Acts 904 to 907 that are processes similar to those in Acts 404 to 407 according to the first embodiment.

Thereafter, the CPU 11 resets the rotational angle data on the wheel 24 to zero (Act 908 of FIG. 25). The CPU 11 also recalculates and converts the first threshold S1 to a corresponding angle (Act 909 of FIG. 25). Similarly, the CPU 11 recalculates and converts the second threshold S2 to a corresponding angle (Act 910 of FIG. 25). Thereafter, the CPU 11 returns to the process of monitoring the signal (Act 85 of FIG. 24).

When the menu item with its image displayed in the menu item image display region 71 has the largest serving size among the menu items of this same type (YES in Act 901), the CPU 11 allows the display 21 to show an error message screen 100 similar to that in Act 411 according to the first embodiment (Act 911 of FIG. 25).

When the error message screen 100 is displayed, the CPU 11 waits for an OK button 101 to be activated (Act 912 of FIG. 25). When the OK button 101 is touched (YES in Act 912), the CPU 11 returns to the process of monitoring the signal (Act 85 of FIG. 24).

The description will be continued referring to FIG. 24 again.

If an upward rotation signal is input through the wheel 24 (YES in Act 87), the CPU 11 executes a serving size decrease process specifically shown in FIG. 26 (Act 100 of FIG. 24).

First, the CPU 11 determines whether or not the menu item with its image displayed in the menu item image display region 71 in the menu item guide screen 70 has the smallest serving size among the menu items of this same type (Act 1001 of FIG. 26). If the menu item does not have the smallest serving size (NO in Act 1001), the CPU 11 measures the downward rotational angle θ2 of the wheel 24 (Act 1002 of FIG. 26).

CPU 11 compares the rotational angle θ2 with the absolute value of the second threshold S2 (Act 1003 of FIG. 26). As a result, if the rotational angle θ2 is less than or equal to the second threshold S2 (NO in Act 1003), the CPU 11 terminates the current serving size decrease process.

In contrast, when the rotational angle θ2 is greater than the second threshold S2 (YES in Act 1003), the CPU 11 determines that reduction of the menu item image has been specified. Here, the CPU 11 executes the processes in Acts 1001, 1002, and 1003 to implement the functions of a reduction instruction section 115.

When reduction of the menu item image is specified, the CPU 11 executes Acts 1004 to 1007 that are processes similar to those in Acts 504 to 507 according to the first embodiment.

Thereafter, the CPU 11 resets the rotational angle data on the wheel 24 to zero (Act 1008 of FIG. 26). The CPU 11 also recalculates and converts the first threshold S1 to a corresponding angle (Act 1009 of FIG. 26). Similarly, the CPU 11 recalculates and converts the second threshold S2 to a corresponding angle (Act 1010 of FIG. 26). Thereafter, the CPU 11 returns to the process of monitoring the signal (Act 85 of FIG. 24).

When the menu item with its image displayed in the menu item image display region 71 has the smallest serving size among the menu items of this same type (YES in Act 1001), the CPU 11 allows the display 21 to show an error message screen 100 similar to that in Act 511 according to the first embodiment (Act 1011 of FIG. 26).

When the error message screen 100 is displayed, the CPU 11 waits for an OK button 101 to be activated (Act 1012 of FIG. 26). When the OK button 101 is touched (YES in Act 1012), the CPU 11 returns to the process of monitoring the touch panel controller 15 (Act 85 of FIG. 24).

In the third embodiment, upward rotation of the wheel 24 by at least the predetermined angle allows enlargement of the menu item image to be specified. Downward rotation of the wheel 24 by at least the predetermined angle allows reduction of the menu item image to be specified. Alternatively, in contrast, downward rotation of the wheel 24 by at least a predetermined angle may allow enlargement of the menu item image to be specified, whereas upward rotation of the wheel 24 by at least a predetermined angle may allow reduction of the menu item image to be specified.

While certain embodiments have been described, these embodiments have been presented by way of example only, and are not intended to limit the scope of the invention. Indeed, the novel methods and systems described herein may be embodied in a variety of other forms; furthermore various omissions, substitutions and changes in the form of the methods and systems described herein may be made without departing from the spirit of the invention. The accompanying claims and their equivalents are intended to cover such forms or modifications as would fall within the scope and spirit of the inventions.

What is claimed is:

1. An order taking apparatus comprising:

an order taking section configured to accept input of an ordered one of a group of menu items;

a storage processing section configured to read information on the order for the menu item the input of which has been accepted by the order taking section, from a menu item information file in which information on the order for each menu item is stored and to store the information in a predetermined order information storage region;

a display processing section configured to read an image of the menu item the input of which has been accepted by the order taking section, from a menu item image file in which an image of each menu item is stored and to allow a display device to display the image; and an enlargement processing section configured such that when the menu item image displayed on the display device is enlarged, the enlargement processing section rewrites the information on the order for the menu item stored in the order information storage region to information on an order for a menu item which is of the same type as that of the current menu item but has a serving size larger than that of the current menu item.

2. The apparatus for claim 1, further comprising:

an enlargement instruction section configured to instruct enlargement of the menu item image displayed on the display device; and an enlargement switching section configured such that when the enlargement instruction section instructs enlargement of the menu item image, the enlargement switching section switches the image on the display device to an image of a menu item which is of the same type as that of the current menu item but has a serving size larger than that of the current menu item.

3. The apparatus for claim 2, further comprising:

a touch input section configured to be overlaid on at least a region of the display device in which the image of the menu item the input of which has been accepted by the order taking section and to sense presence or absence of touch with at least two points and motion of touch points to determine that information has been input, wherein when the touch input section senses motion in which the at least two touch points are separated from each other by at least a predetermined distance, the enlargement instruction section instructs enlargement of the menu item image.

4. The apparatus for claim 2, further comprising:

a rotational input section configured to detect the degree of rotation in two one-dimensional directions to determine that information has been input, wherein when the degree of rotation in one direction detected by the rotational input section is greater than a predetermined value, the enlargement instruction section instructs enlargement of the menu item image.

5. The apparatus for claim 2, wherein when the menu item corresponding to the image displayed in the display device has the largest serving size among the menu items of this same type and when the enlargement instruction section instructs enlargement of the menu item image, the enlargement processing section indicates that no menu item with a serving size larger than that of the current menu item is capable of being ordered, without rewriting the information on the order for the current menu item stored in the order information storage region.

6. The apparatus for claim 1, further comprising:

a reduction processing section configured such that when the menu item image displayed on the display device is reduced, the reduction processing section rewrites the information on the order for the menu item stored in the order information storage region to information on an order for a menu item which is of the same type as that of the current menu item but has a serving size smaller than that of the current menu item.

7. The apparatus for claim 6, further comprising:

a reduction instruction section configured to instruct reduction of the menu item image displayed on the display device; and a reduction switching section configured such that when the reduction instruction section instructs reduction of the menu item image, the reduction switching section switches the image on the display device to an image of a menu item which is of the same type as that of the current menu item but has a serving size smaller than that of the current menu item.

8. The apparatus for claim 7, further comprising:

a touch input section configured to be overlaid on at least a region of the display device in which the image of the menu item the input of which has been accepted by the order taking section and to sense presence or absence of touch with at least two points and motion of touch points to determine that information has been input, wherein when the touch input section senses motion in which the at least two touch points approach each other by at least a predetermined distance, the reduction instruction section instructs reduction of the menu item image.

9. The apparatus for claim 7, further comprising:

a rotational input section configured to detect the degree of rotation in two one-dimensional directions to determine that information has been input, wherein when the degree of rotation in a direction opposite to the one direction detected by the rotational input section is greater than a predetermined value, the reduction instruction section instructs reduction of the menu item image.

10. The apparatus for claim 7, wherein when the menu item corresponding to the image displayed in the display device has the smallest serving size among the menu items of this same type and when the reduction instruction section instructs reduction of the menu item image, the reduction processing section indicates that no menu item with a serving size smaller than that of the current menu item is capable of being ordered, without rewriting the information on the order for the current menu item stored in the order information storage region.

11. An order taking apparatus comprising:

an order taking section configured to accept input of an ordered one of a group of menu items;

a storage processing section configured to read information on the order for the menu item the input of which has been accepted by the order taking section, from a menu item information file in which information on the order for each menu item is stored and to store the information in a predetermined order information storage region;

a display processing section configured to read an image of the menu item the input of which has been accepted by the order taking section, from a menu item image file in which an image of each menu item is stored and to allow a display device to display the image; and a reduction processing section configured such that when the menu item image displayed on the display device is reduced, the reduction processing section rewrites the information on the order for the menu item stored in the order information storage region to information on an order for a menu item which is of the same type as that of the current menu item but has a serving size smaller than that of the current menu item.

12. The apparatus for claim 11, further comprising:

a reduction instruction section configured to instruct reduction of the menu item image displayed on the display device; and a reduction switching section configured such that when the reduction instruction section instructs reduction of the menu item image, the reduction switching section switches the image on the display device to an image of a menu item which is of the same type as that of the current menu item but has a serving size smaller than that of the current menu item.

13. The apparatus for claim 12, further comprising:

a touch input section configured to be overlaid on at least a region of the display device in which the image of the menu item the input of which has been accepted by the order taking section and to sense presence or absence of touch with at least two points and motion of touch points to determine that information has been input, wherein when the touch input section senses motion in which the at least two touch points approach each other by at least a predetermined distance, the reduction instruction section instructs reduction of the menu item image.

14. The apparatus for claim 12, further comprising:

a rotational input section configured to detect the degree of rotation in two one-dimensional directions to determine that information has been input, wherein when the degree of rotation in a direction opposite to the one direction detected by the rotational input section is greater than a predetermined value, the reduction instruction section instructs reduction of the menu item image.

15. The apparatus for claim 12, wherein when the menu item corresponding to the image displayed in the display device has the smallest serving size among the menu items of this same type and when the reduction instruction section instructs reduction of the menu item image, the reduction processing section indicates that no menu item with a serving size smaller than that of the current menu item is capable of being ordered, without rewriting the information on the order for the current menu item stored in the order information storage region.

16. A computer-readable storage medium in which an order taking program is stored, the order taking program allowing a computer to implement:

a function to accept input of an ordered one of a group of menu items;

a function to read information on the order for the menu item the input of which has been accepted, from a menu item information file in which information on the order for each menu item is stored and to store the information in a predetermined order information storage region;

a function to read an image of the menu item the input of which has been accepted, from a menu item image file in which an image of each menu item is stored and to allow a display device to display the image; and a function to write, when the menu item image displayed on the display device is enlarged, the information on the order for the menu item stored in the order information storage region to information on an order for a menu item which is of the same type as that of the current menu item but has a serving size larger than that of the current menu item.

17. The storage medium for claim 16, wherein the order taking program further allows the computer to implement:

a function to instruct enlargement of the menu item image displayed on the display device;

a function to switch, when the enlargement instruction section instructs enlargement of the menu item image, the image on the display device to an image of a menu item which is of the same type as that of the current menu item but has a serving size larger than that of the current menu item.

18. The storage medium for claim 16, wherein the order taking program further allows the computer to implement:

a function to rewrite, when the menu item image displayed on the display device is reduced, the information on the order for the menu item stored in the order information storage region to information on an order for a menu item which is of the same type as that of the current menu item but has a serving size smaller than that of the current menu item.

19. The storage medium for claim 18, wherein the order taking program further allows the computer to implement:

a function to instruct reduction of the menu item image displayed on the display device; and a function to switch, when the reduction instruction section instructs reduction of the menu item image, switch the image on the display device to an image of a menu item which is of the same type as that of the current menu item but has a serving size smaller than that of the current menu item.

* * * * *